(12) United States Patent
Nadamuni Raghavan et al.

(10) Patent No.: US 11,494,597 B2
(45) Date of Patent: Nov. 8, 2022

(54) GENERATIVE MEMORY FOR LIFELONG MACHINE LEARNING

(71) Applicant: SRI International, Menlo Park, CA (US)

(72) Inventors: Aswin Nadamuni Raghavan, Princeton, NJ (US); Jesse Hostetler, Princeton, NJ (US); Indranil Sur, Plainsboro, NJ (US); Abrar Abdullah Rahman, Bellerose, NY (US); Sek Meng Chai, Princeton, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 417 days.

(21) Appl. No.: 16/825,953

(22) Filed: Mar. 20, 2020

(65) Prior Publication Data

US 2020/0302339 A1 Sep. 24, 2020

Related U.S. Application Data

(60) Provisional application No. 62/822,704, filed on Mar. 22, 2019.

(51) Int. Cl.
*G06K 9/62* (2022.01)
*G06N 20/00* (2019.01)
(Continued)

(52) U.S. Cl.
CPC ......... *G06K 9/6281* (2013.01); *G06F 3/0659* (2013.01); *G06F 9/3836* (2013.01);
(Continued)

(58) Field of Classification Search
CPC .. G06K 9/6281; G06K 9/6267; G06K 9/6218; G06V 10/762; G06V 10/40;
(Continued)

(56) References Cited

U.S. PATENT DOCUMENTS 9,704,054 B1 * 7/2017 Tappen ................ G06K 9/6281
2017/0178245 A1 * 6/2017 Rodkey ................. G06Q 40/08
(Continued)

OTHER PUBLICATIONS

Abbeel et al., "Apprenticeship learning via inverse reinforcement learning," ACM, Proceedings of the Twenty-First International Conference on Machine Learning, ICML '04, Jul. 2004, 8 pp.
(Continued)

*Primary Examiner* — Kyung H Shin
(74) *Attorney, Agent, or Firm* — Shumaker & Sieffert, P.A.

(57) ABSTRACT

Techniques are disclosed for training machine learning systems. An input device receives training data comprising pairs of training inputs and training labels. A generative memory assigns training inputs to each archetype task of a plurality of archetype tasks, each archetype task representative of a cluster of related tasks within a task space and assigns a skill to each archetype task. The generative memory generates, from each archetype task, auxiliary data comprising pairs of auxiliary inputs and auxiliary labels. A machine learning system trains a machine learning model to apply a skill assigned to an archetype task to training and auxiliary inputs assigned to the archetype task to obtain output labels corresponding to the training and auxiliary labels associated with the training and auxiliary inputs assigned to the archetype task to enable scalable learning to obtain labels for new tasks for which the machine learning model has not previously been trained.

20 Claims, 12 Drawing Sheets

(51) Int. Cl.

| | |
|---|---|
| *G06N 3/08* | (2006.01) |
| *G06F 9/38* | (2018.01) |
| *G06F 9/48* | (2006.01) |
| *G06F 3/06* | (2006.01) |
| *G06Q 40/08* | (2012.01) |
| *G06N 3/04* | (2006.01) |

(52) U.S. Cl.
  CPC ............... *G06F 9/48* (2013.01); *G06K 9/623* (2013.01); *G06K 9/6215* (2013.01); *G06K 9/6256* (2013.01); *G06N 3/0409* (2013.01); *G06N 3/08* (2013.01); *G06N 20/00* (2019.01); *G06Q 40/08* (2013.01)

(58) Field of Classification Search
  CPC .. G06V 10/454; G06N 3/0409; G06N 3/0454; G06N 3/082; G06N 3/08; G06N 3/0445; G06Q 40/08; G06Q 40/10; G06Q 40/02; G06Q 30/0201; G06Q 30/0202; G06Q 30/0206; G06Q 30/02; G06Q 30/06; G06F 16/00; G06F 3/0659; G06F 3/0673; G06F 3/0604; G06F 12/0284
  See application file for complete search history.

(56) References Cited

U.S. PATENT DOCUMENTS

2020/0074273 A1\* 3/2020 Schmidt ............... G06N 3/0409
2020/0160150 A1\* 5/2020 Hashemi ............... G06F 3/0659

OTHER PUBLICATIONS

Abel et al., "Agent-Agnostic Human-in-the-Loop Reinforcement Learning," Curran Associates, Proceedings of the NIPS 2016 Workshop on the Future of Interactive Learning Machines, Dec. 5-10, 2016, 13 pp.
Anderson, "Acquisition of Cognitive Skill," American Psychological Association, Inc., Psychological Review, 89(4), 1982, pp. 369-406 (Applicant points out, in accordance with MPEP 609.04(a), that the year of publication, 1982, is sufficiently earlier than the effective U.S. filing date, so that the particular month of publication is not in issue.).
Asgharbeygi et al.,"Guiding inference through relational reinforcement learning," Springer, Proceedings of the Fifteenth International Conference on Inductive Logic Programming, Aug. 10-13, 2005, pp. 20-37.
Bacon et al., "The Option-Critic Architecture," AAAI Press, Proceedings of the Thirty-First AAAI Conference on Artificial Intelligence (AAAI-17), Feb. 4-9, 2017, pp. 1726-1734.
Chaffin et al., "Preparing for memorized cello performance: the role of performance cues," Psychology of Music, 38(1), Jan. 1, 2010, 29 pp.
Christiano et al., "Deep Reinforcement Learning from Human Preferences," Curran Associates, Proceedings of the Thirty-First Annual Conference on Advances in Neural Information Processing Systems (NIPS 2017), Dec. 4-9, 2017, 9 pp.
De la Cruz et al., "Pre-training Neural Networks with Human Demonstrations for Deep Reinforcement Learning," CoRR, abs/1709.04083, Sep. 12, 2017, pp. 8.
Ericcson et al., "The role of deliberate practice in the acquisition of expert performance," Psychological Review, vol. 100(3), Jul. 1993, pp. 363-406.
Eriksen et al., "Visual attention within and around the field of focal attention: A zoom lens model," Psychonomic Society, Perception & Psychophysics, 40(4), Aug. 4, 1986, pp. 225-240.
Flegal et al., "Overthinking skilled motor performance: Or why those who teach can't do," Psychonomic Society, Inc., Psychonomic Bulletin & Review, 15(5), Oct. 2008, pp. 927-932.
Gershman et al., "Reinforcement Learning and Episodic Memory in Humans and Animals: An Integrative Framework," Annual Review of Psychology, 68:101-128, Jan. 3, 2017, 30 pp.
Gersavio et al., "Explanation to Avert Surprise," Proceedings of the Explainable Smart Systems Workshop at the Twenty-Third International Conference on Intelligent User Interfaces, Mar. 2018, 4 pp.
Golding et al., "Learning General Search Control from Outside Guidance," Proceedings of the Tenth International Joint Conference on Artificial Intelligence (InIJCAI), Aug. 23, 1987, pp. 334-337.
Griffith et al., "Policy Shaping: Integrating Human Feedback with Reinforcement Learning," Curran Associates, Proceedings of the Twenty-Seventh Annual Conference on Advances in Neural Information Processing Systems, Dec. 5-10, 2013, 9 pp.
Hagemann et al., "Training perceptual skill by orienting visual attention," Human Kinetics, Inc., Journal of Sport and Exercise Psychology, 28(2), Apr. 2006, pp. 143-158.
Itti et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.
Jimenez et al., "Implicit Sequence Learning with Competing Explicit Cues," The Quarterly Journal of Experimental Psychology Section A, 54, May 1, 2001, pp. 345-369.
Johnson et al., "The Malmo Platform for Artificial Intelligence Experimentation," AAAI Press, Proceedings of the Twenty-Fifth International Joint Conference on Artificial Intelligence, Jul. 9-15, 2016, pp. 4246-4247.
Subramanian et al., "Efficient Exploration in Monte Carlo Tree Search using Human Action Abstractions," Curran Associates, in Proceedings of the Future of Interactive Learning Machines Workshop at NIPS 2016, Dec. 5-10, 2016, 10 pp.
Knox et al., "Interactively Shaping Agents via Human Reinforcement: The TAMER framework," ACM, in Proceedings of the Fifth International Conference on Knowledge Capture, Sep. 2009, 8 pp.
Krening et al., "Learning From Explanations Using Sentiment and Advice in RL," IEEE Transactions on Cognitive and Developmental Systems, 9, Mar. 2017, pp. 44-55.
Kuhlmann et al., "Guiding a Reinforcement Learner with Natural Language Advice: Initial Results in RoboCup Soccer," AAAI Press, in Proceedings of the AAAI-04 Workshop on Supervisory Control of Learning and Adaptive Systems, Jul. 2004, 6 pp.
Kulkarni et al., "Hierarchical Deep Reinforcement Learning: Integrating Temporal Abstraction and Intrinsic Motivation," Curran Associates, in Proceedings of the Thirtieth Annual Conference on Advances in Neural Information Processing Systems, Dec. 5-10, 2016. 9 pp.
Kumaran et al., "What Learning Systems do Intelligent Agents Need? Complementary Learning Systems Theory Updated," Trends in Cognitive Sciences, vol. 20; No. 7, Jul. 2016, pp. 512-534.
Lin, "Self-Improving Reactive Agents Based on Reinforcement Learning, Planning and Teaching," Machine Learning; 8, May 1992, pp. 293-321.
Lin et al., "Explore, Exploit or Listen: Combining Human Feedback and Policy Model to Speed up Deep Reinforcement Learning in 3D Worlds," CoRR, abs/1709.03969, Sep. 12, 2017, 8 pp.
MacGlashan et al., "Interactive Learning from Policy-Dependent Human Feedback," PMLR, in Proceedings of the Thirty-Fourth International Conference on Machine Learning, vol. 70, Aug. 6-11, 2017, 10 pp.
MacLin et al., "Giving Advice about Preferred Actions to Reinforcement Learners Via Knowledge-Based Kernel Regression," AAAI Press, in Proceedings of the Twentieth National Conference on Artificial Intelligence, Jul. 9-13, 2005, 6 pp.
McCarthy, "Programs with Common Sense," Proceedings of the Teddington Conference on the Mechanization of Thought Processes, Dec. 1958, 15 pp.
McClelland et al., "Why There Are Complementary Learning Systems in the Hippocampus and Neocortex: Insights From the Successes and Failures of Connectionist Models of Learning and Memory," Psychological Review, vol. 102, No. 3, Jul. 1995, pp. 419-457.
Milner et al., "Cognitive Neuroscience and the Study of Memory," Neuron, 20(3), Mar. 1998, pp. 445-468.

(56) References Cited

OTHER PUBLICATIONS

Mnih et al., "Playing Atari with Deep Reinforcement Learning," CoRR, abs/1312.5602, Dec. 19, 2013, 9 pp.
Myers, "Advisable Planning Systems," AAAI Press, ARPI 1996 Proceedings, Advanced Planning Technology, Jul. 1996, pp. 206-209.
Nason et al., "Soar-RL: Integrating Reinforcement Learning with Soar," Elsevier B.V, Cognitive Systems Research, 6(1), Mar. 2005, pp. 51-59.
Ng et al., "Algorithms for Inverse Reinforcement Learning," Morgan Kaufmann, in Proceedings of the Seventeenth International Conference on Machine Learning (ICML-2000), Jun. 29-Jul. 2, 2000, 8 pp.
Petersen et al., "The effects of practice on the functional anatomy of task performance," in Proceedings of the National Academy of Sciences (PNAS), 95(3), Feb. 1998, pp. 853-860.
Plappert, "keras-rl/keras-rl: Deep Reinforcement Learning for Keras," GitHub, Retrieved Aug. 14, 2020 from https://github.com/keras-rl/keras-rl, 2016, 5 pp. (Applicant points out, in accordance with MPEP 609.04(a), that the year of publication, 2016, is sufficiently earlier than the effective U.S. filing date, so that the particular month of publication is not in issue.).
Posner et al., "Attention and the Detection of Signals," Journal of Experimental Psychology, 109(2), Jun. 1980, pp. 160-174.
Reber et al., "Encapsulation of Implicit and Explicit Memory in Sequence Learning," Journal of Cognitive Neuroscience, 10(2), Mar. 1998, pp. 248-263.
Schaal, "Is Imitation Learning the Route to Humanoid Robots?," Trends in Cognitive Sciences, 3(6), Jun. 1999, 19 pp.
Sherry et al., "The Evolution of Multiple Memory Systems," Psychological Review, 94(4), Oct. 1987, pp. 439-454.
Silver et al., "Mastering the Game of Go without Human Knowledge," in Nature, 550, Oct. 2017, 43 pp.
Squire, "Memory systems of the brain: A brief history and current perspective," Elsevier, Inc., Neurobiology of Learning and Memoiy, 82, Nov. 2004, pp. 171-177.
Sun et al., "From Implicit Skills to Explicit Knowledge: A Bottom-Up Model of Skill Learning," Cognitive Science, 25(2), Mar. 2001, pp. 203-244.
Taylor et al., "The role of strategies in motor learning," Annals of the New York Academy of Sciences, 1251, Mar. 2012, 12 pp.
Towell et al., "Knowledge-based artificial neural networks," Artificial Intelligence, vol. 70, Issues 1-2, Oct. 1994, 45 pp.
Watkins et al., "Q-learning," Machine Learning, 8, May 1992, pp. 279-292.
Weber et al., "Imagination-Augmented Agents for Deep Reinforcement Learning," CoRR, abs/1707.06203, Jul. 19, 2017, 19 pp.
Weinberg, "Does imagery work? Effects on performance and mental skills," Journal of Imagery Research in Sport and Physical Activity, 3(1), Feb. 14, 2008, 22 pp.
Wintermute, "Using Imagery to Simplify Perceptual Abstraction in Reinforcement Learning Agents" AAAI Press, in Proceedings of the Twenty-Fourth AAAI Conference on Artificial Intelligence (AAAI-10), Jul. 11-15, 2010, pp. 1567-1573.
Wulf et al., "Motor skill learning and performance: A review of influential factors," Blackwell Publishing Ltd. 2009, Medical Education, vol. 44, Jan. 2010, pp. 75-84.
Xu et al., "Show, Attend and Tell: Neural Image Caption Generation with Visual Attention," in Proceedings of the 32nd International Conference on Machine Learning, PMLR 37, Jul. 7-9, 2015, 10 pp.
Yeh et al., "Bridging the Gap: Converting Human Advice into Imagined Examples," Advances in Cognitive Systems 7 (2018), Dec. 2018, pp. 117-136.
Perez-Liebana et al., "The Multi-Agent Reinforcement Learning in MalmÖ (MARLÖ) Competition," arXiv.org; cs- preprint, arXiv:1901.08129, Jan. 23, 2019, 4 pp.
Guss et al., "NeurIPS 2019 Competition: The MineRL Competition on Sample Efficient Reinforcement Learning using Human Priors," arXiv.org > cs > arXiv:1904.10079, Jul. 29, 2019, 28 pp.

"What is Minecraft?," Minecraft: Mojang Synergies AB, Retrieved from: https://www.minecraft.net/en-us/what-is-minecraft/, Accessed date: Oct. 10, 2019, 4 pp.
"Project Malmo- Microsoft Research," Microsoft, Retrieved from: https://www.microsoft.com/en-us/research/project/project-malmo/, Accessed date: Oct. 10, 2019, 7 pp.
Kirkpatrick et al., "Overcoming catastrophic forgetting in neural networks", Proceedings of the National Academy of Sciences, 114(13), Mar. 28, 2017, pp. 3521-3526.
Rebuffi et al., "iCaRL: Incremental Classifier and Representation Learning," in Proceedings of the IEEE Conference on Computer Vision and Pattern Recognition (CVPR), Jul. 2017, pp. 2001-2010.
Nguyen et al., "Variational Continual Learning," arXiv preprint arXiv:1710.10628, Nov. 3, 2017, 17 pp.
Masse et al., "Alleviating catastrophic forgetting using context-dependent gating and synaptic stabilization", arXiv preprint arXiv:1802.01569, Feb. 2, 2018, 12 pp.
Rusu et al., "Progressive Neural Networks," arXiv preprint arXiv:1606.04671, Jun. 21, 2016, 14 pp.
Fernando et al., "PathNet: Evolution Channels Gradient Descent in Super Neural Networks," arXiv preprint arXiv:1701.08734, Jan. 30, 2017, 16 pp.
Van de Ven et al., "Generative replay with feedback connections as general strategy for continual learning," arXiv preprint arXiv:1809.10635, Sep. 27, 2018, 17 pp.
Mocanu et al., "Online Contrastive Divergence with Generative Replay: Experience Replay without Storing Data," arXiv preprint arXiv:1610.05555, Oct. 18, 2016, 16 pp.
Shin et al., "Continual Learning with Deep Generative Replay", 31st Conference on Neural Information Processing Systems (NIPS 2017), Dec. 4-9, 2017, 10 pp.
Wei et al., "Differential roles of sleep spindles and sleep slow oscillations in memory consolidation," bioRxiv 153007 preprint, Jun. 21, 2017, 46 pp.
Wei et al., "Differential roles of sleep spindles and sleep slow oscillations in memory consolidation," PLOS Computational Biology, 14(7): e1006322, Jul. 9, 2018, 32 pp.
Isele et al., "Selective Experience Replay for Lifelong Learning." arXiv preprint arXiv:1802.10269, Feb. 28, 2018, 9 pp.
Sohn et al., "Learning Structured Output Representation using Deep Conditional Generative Models," Advances in Neural Information Processing Systems 28 (NIPS 2015), Dec. 7-12, 2015, 9 pp.
Raghavan et al., "Generative Memory for Lifelong Reinforcement Learning," Neuro-Inspired Computational Elements (NICE 2019), Feb. 22, 2019, 3 pp.
U.S. Appl. No. 16/810,324, filed Mar. 5, 2020, naming inventors Yeh et al.
Efron et al., "The bootstrap estimate of standard error," Chapter 6: An introduction to the bootstrap, Chapman & Hall, 1993, 12 pp. (Applicant points out, in accordance with MPEP 609.04(a), that the year of publication, 1993, is sufficiently earlier than the effective U.S filing date of the present application and any foreign priority date, so that the particular month of publication is not in issue.).
Eriksen et al., "Allocation of attention in the visual field," Journal of Experimental Psychology: Human Perception and Performance: 11(5), Oct. 1985, pp. 583-597.
Fitts et al., "Human performance," Oxford, England: Brooks/Cole, 1967, 53 pp. (Applicant points out, in accordance with MPEP 609.04(a), that the year of publication, 1967, is sufficiently earlier than the effective U.S. filing date of the present application and any foreign priority date, so that the particular month of publication is not in issue.).
Henke, "A model for memory systems based on processing modes rather than consciousness," Nature Reviews Neuroscience: vol. 11, Jul. 2010, pp. 523-532.
Mostow, "Machine transformation of advice into a heuristic search procedure," Chapter 12: Machine Learning, Morgan Kaufmann, 1983, pp. 367-403 (Applicant points out, in accordance with MPEP 609.04(a), that the year of publication, 1983, is sufficiently earlier than the effective U.S. filing date of the present application and any foreign priority date, so that the particular month of publication is not in issue.).

(56) References Cited

OTHER PUBLICATIONS

Rozanov et al., "The specificity of memory for a highly trained finger movement sequence: Change the ending, change all," Elsevier, Brain Research: 1331, Mar. 2010, pp. 80-87.
Sutton et al., "Reinforcement Learning: An Introduction," MIT Press: Second Edition, Oct. 19, 2018, 548 pp.
Toro Icarte et al., "Advice-based exploration in model-based reinforcement learning," in Proceedings of the Thirty-First Canadian Conference in Artificial Intelligence, Apr. 2018, 5 pp.

* cited by examiner

GENERATIVE MEMORY FOR LIFELONG MACHINE LEARNING

This application claims the benefit of U.S. Provisional Application No. 62/822,704 by Chai et al., entitled "GENERATIVE MEMORY FOR LIFELONG REINFORCEMENT LEARNING," which was filed on Mar. 22, 2019. The entire content of Application No. 62/822,704 is incorporated herein by reference.

GOVERNMENT RIGHTS

This invention was made with Government support under agreement HR0011-18-C-0051 by Defense Advanced Research Projects Agency. The Government has certain rights in this invention.

TECHNICAL FIELD

This disclosure generally relates to machine learning systems.

BACKGROUND

An autonomous system is a robot or machine that performs behaviors or tasks with a high degree of autonomy. An autonomous system is typically capable of operating for an extended period of time without human intervention. A typical autonomous system is capable of gathering information about its environment and traversing the environment without human assistance. Further, an autonomous system uses such information collected from the environment to make independent decisions to carry out objectives.

Some autonomous systems may implement a machine learning system that applies a model generated by a neural network, such as a reinforcement learning network, to perform a specified task. Machine learning systems may require a large amount of "training data" to build an accurate model. However, once trained, machine learning systems may be able to perform a wide variety of tasks previously thought to be capable only by a human being. For example, autonomous systems that implement machine learning systems may be well suited to tasks in fields such as spaceflight, household maintenance, wastewater treatment, delivering goods and services, military applications, cyber security, network management, AI assistants, and augmented reality or virtual reality applications.

SUMMARY

In general, the disclosure describes techniques for generating training data for training a machine learning model to output one or more labels for solving previously unlearned tasks. In one example, an input device receive training data defining one or more tasks. The training data comprises a plurality of pairs of training inputs and training labels. A generative memory assigns one or more of the training inputs to each archetype task of a plurality of archetype tasks. Each archetype task is representative of a cluster of related tasks within a task space. Further, the generative memory assigns, to each archetype task, a corresponding skill. The generative memory applies, for each archetype task, auxiliary inputs to the skill assigned to the archetype task to obtain auxiliary labels so as to generate auxiliary data comprising a plurality of pairs of the auxiliary inputs and the auxiliary labels. The generative memory assigns one or more of the auxiliary inputs to each archetype task of the plurality of archetype tasks.

A machine learning system trains a machine learning model with the training data and the auxiliary data to apply a skill assigned to an archetype task of the plurality of archetype tasks to the training inputs assigned to the archetype task and the auxiliary inputs assigned to the archetype task to obtain one or more output labels. The one or more output labels correspond to the training labels and the auxiliary labels associated with the training inputs and auxiliary inputs assigned to the archetype task. In this fashion, the machine learning model may perform scalable learning to obtain labels for new tasks for which the machine learning model has not previously been trained.

Furthermore, the computation engine is further configured to generate, from a first archetype task of the plurality of archetype tasks, auxiliary data comprising a plurality of auxiliary inputs. The machine learning model of the machine learning system may apply, to the plurality of auxiliary inputs, a first skill of the plurality of skills assigned to the first archetype task of the plurality of archetype tasks to obtain one or more auxiliary labels for the plurality of auxiliary inputs. The machine learning system may train the machine learning model with the training data and the auxiliary data to decrease the time required for the machine learning model to learn new tasks.

The techniques of the disclosure provide specific improvements to the computer-related field of machine learning that have at least one practical application. For example, the techniques disclosed herein may enable more efficient training of machine learning systems, such as reinforcement learning systems. Furthermore, the techniques disclosed herein may enable more efficient use of the memory of the machine learning system, thereby allowing for a reduction in the size of the memory of the machine learning system. Furthermore, the techniques disclosed herein may enable a machine learning system to perform scalable, lifelong learning of solutions for new tasks the machine learning system has not previously been trained to solve, while reducing the occurrence of catastrophic forgetting (e.g., forgetting solutions to old tasks as a result of learning solutions to new tasks). Accordingly, the techniques disclosed herein may increase the accuracy and efficiency of machine learning systems in solving actions for a wide variety of new and old tasks in an environment.

In one example, this disclosure describes a computing system comprising: an input device configured to receive training data defining one or more tasks, wherein the training data comprises a plurality of pairs of training inputs and training labels; a computation engine comprising processing circuitry, wherein the computation engine is configured to execute a generative memory configured to: assign one or more of the training inputs to each archetype task of a plurality of archetype tasks, wherein each archetype task of the plurality of archetype tasks is representative of a cluster of related tasks within a task space; assign, to each archetype task of the plurality of archetype tasks, a corresponding skill of a plurality of skills; generate, for each archetype task of the plurality of archetype tasks, auxiliary inputs; apply, for each archetype task of the plurality of archetype tasks, auxiliary inputs to the skill assigned to the archetype task to obtain auxiliary labels to generate, from the auxiliary inputs and the auxiliary labels, auxiliary data comprising a plurality of pairs of the auxiliary inputs and the auxiliary labels; assign one or more of the auxiliary inputs to each archetype task of the plurality of archetype tasks; and a machine learning system executed by the processing circuitry and configured to: train a machine learning model with the training data and the auxiliary data to apply, for an archetype task of the plurality of archetype tasks, the skill of the plurality of skills assigned to the archetype task to the one or more training inputs assigned to the archetype task and the one or more auxiliary inputs assigned to the archetype task to obtain one or more output labels that correspond to one or more of the training labels and the auxiliary labels, wherein the one or more training labels are associated with the one or more training inputs assigned to the archetype task and wherein the one or more auxiliary labels are associated with the one or more auxiliary inputs assigned to the archetype task such that the generative memory is capable of generating the auxiliary data from old tasks for use in training the machine learning model to obtain labels for new tasks for which the machine learning model has not previously been trained.

In another example, this disclosure describes a method comprising: receiving, by an input device, training data defining one or more tasks, wherein the training data comprises a plurality of pairs of training inputs and training labels; assigning, by a generative memory executed by a computation engine comprising processing circuitry, one or more of the training inputs to each archetype task of a plurality of archetype tasks, wherein each archetype task of the plurality of archetype tasks is representative of a cluster of related tasks within a task space; assigning, by the generative memory and to each archetype task of the plurality of archetype tasks, a corresponding skill of a plurality of skills; generating, by the generative memory and for each archetype task of the plurality of archetype tasks, auxiliary inputs; applying, by the generative memory and for each archetype task of the plurality of archetype tasks, auxiliary inputs to the skill assigned to the archetype task to obtain auxiliary labels to generate, from the auxiliary inputs and the auxiliary labels, auxiliary data comprising a plurality of pairs of the auxiliary inputs and the auxiliary labels; assigning, by the generative memory one or more of the auxiliary inputs to each archetype task of the plurality of archetype tasks; and training, by a machine learning system executed by the processing circuitry, a machine learning model with the training data and the auxiliary data to apply, for an archetype task of the plurality of archetype tasks, the skill of the plurality of skills assigned to the archetype task to the one or more training inputs assigned to the archetype task and the one or more auxiliary inputs assigned to the archetype task to obtain one or more output labels that correspond to one or more of the training labels and the auxiliary labels, wherein the one or more training labels are associated with the one or more training inputs assigned to the archetype task and wherein the one or more auxiliary labels are associated with the one or more auxiliary inputs assigned to the archetype task such that the generative memory is capable of generating the auxiliary data from old tasks for use in training the machine learning model to obtain labels for new tasks for which the machine learning model has not previously been trained.

In another example, this disclosure describes a non-transitory computer-readable medium comprising instructions that, when executed, are configured to cause processing circuitry of a computing device to: receive training data defining one or more tasks, wherein the training data comprises a plurality of pairs of training inputs and training labels; execute a generative memory configured to: assign one or more of the training inputs to each archetype task of a plurality of archetype tasks, wherein each archetype task of the plurality of archetype tasks is representative of a cluster of related tasks within a task space; assign, to each archetype task of the plurality of archetype tasks, a corresponding skill of a plurality of skills; generate, for each archetype task of the plurality of archetype tasks, auxiliary inputs; apply, for each archetype task of the plurality of archetype tasks, auxiliary inputs to the skill assigned to the archetype task to obtain auxiliary labels to generate, from the auxiliary inputs and the auxiliary labels, auxiliary data comprising a plurality of pairs of the auxiliary inputs and the auxiliary labels; assign one or more of the auxiliary inputs to each archetype task of the plurality of archetype tasks; and execute a machine learning system executed by the processing circuitry and configured to train a machine learning model with the training data and the auxiliary data to apply, for an archetype task of the plurality of archetype tasks, the skill of the plurality of skills assigned to the archetype task to the one or more training inputs assigned to the archetype task and the one or more auxiliary inputs assigned to the archetype task to obtain one or more output labels that correspond to one or more of the training labels and the auxiliary labels, wherein the one or more training labels are associated with the one or more training inputs assigned to the archetype task and wherein the one or more auxiliary labels are associated with the one or more auxiliary inputs assigned to the archetype task such that the generative memory is capable of generating the auxiliary data from old tasks for use in training the machine learning model to obtain labels for new tasks for which the machine learning model has not previously been trained.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
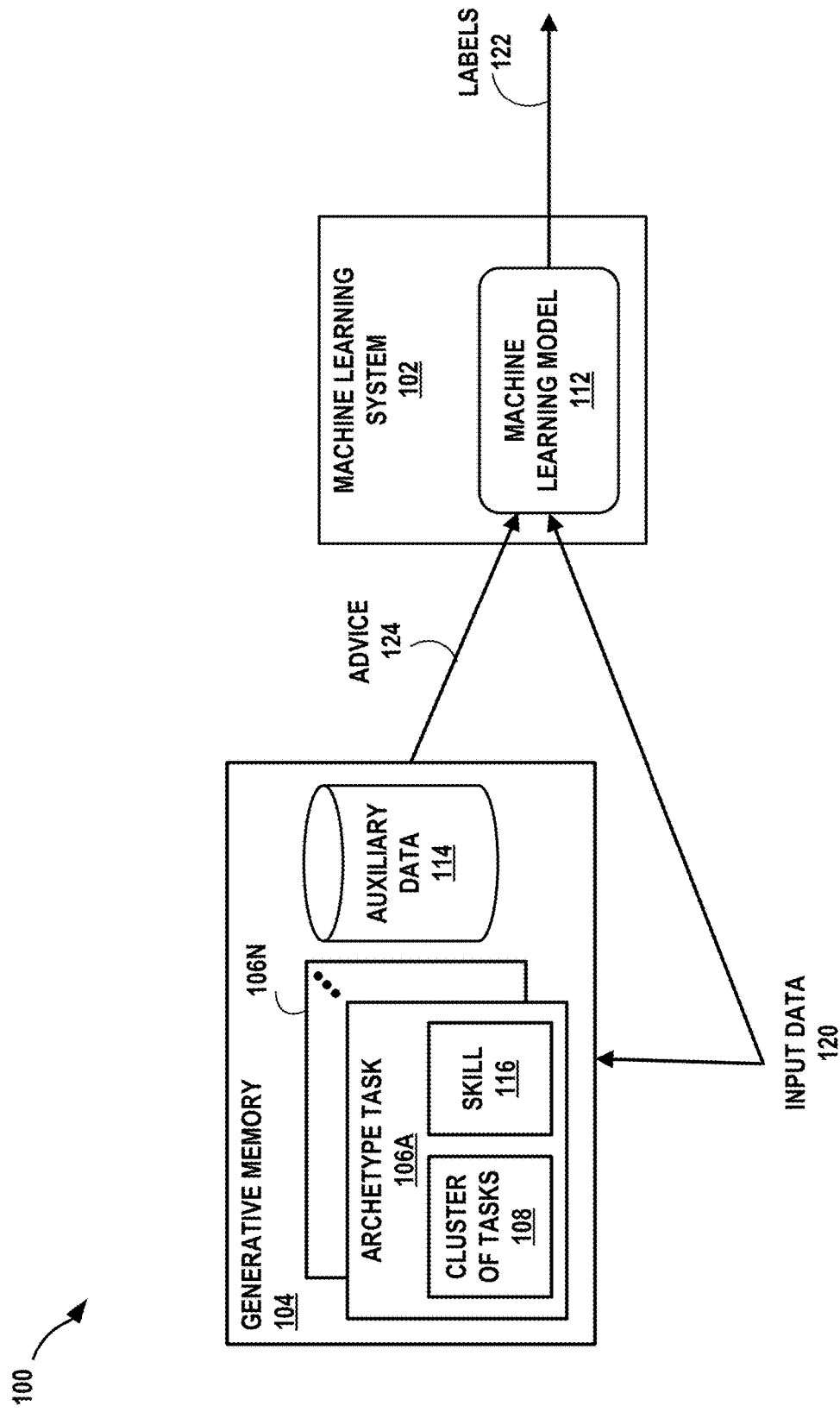
FIG. 1 is a block diagram illustrating an example system for training a machine learning model using a generative memory in accordance with the techniques of the disclosure.

FIG. 1 is a block diagram illustrating an example system 100 for training machine learning model 112 using generative memory 104 in accordance with the techniques of the disclosure. Machine learning system 102 represents one or more computing devices to perform operations described herein to process input data 120 to determine one or more output labels 122 for system 100 to take to solve tasks for input data 120. Machine learning system 102 may include processing circuitry and memory as described in further detail with respect to FIG. 2. As described herein, generative memory 104 is capable of generating the auxiliary data from old tasks for use in training machine learning model 112 to obtain labels for new tasks for which machine learning model 116 has not previously been trained to enable machine learning system 102 to perform lifelong, scalable learning.

In the example of FIG. 1, machine learning system 102 includes machine learning model 112. Machine learning system 102 trains machine learning model 112 to output one or more labels 122. In some examples, labels 122 may include one or more actions for achieving a task for input data 120. As described herein, input data 120 comprises a plurality of inputs and a plurality of labels, each input paired with a corresponding label. In examples where machine learning system 102 is a reinforcement learning system, input data 120 may include observations from actions taken by system 100 within an environment. In some examples, machine learning model 112 is a reinforcement learning system that attempts to evaluate one or more actions in an environment to maximize a cumulative reward. In contrast to supervised machine learning, in which a supervised machine learning system is trained (e.g., "learns") from training data that includes both input data and corresponding specified output data, a reinforcement learning system trains a reinforcement learning model with observations based on analysis of an outcome of an action that the reinforcement learning model performed in the environment.

As depicted in FIG. 1, machine learning model 112 outputs one or more labels 122. Labels 122 may be specific to a domain for system 100. In some examples where system 100 performs image recognition, labels 122 may indicate a type of object represented by input data 120. In some examples, labels 122 may include one or more actions for system 100 to perform.

For example, where system 100 is implemented within an autonomous vehicle, such actions may allow system 100 to navigate the autonomous vehicle through an environment, and may include, e.g., an action to accelerate, decelerate, stop, steer left or right, or activate or deactivate indicator lights, etc. As another example, where system 100 is implemented within an unmanned aerial vehicle, such actions may allow system 100 to pilot the unmanned aerial vehicle through an environment. As another example, where system 100 is implemented within a computer game or artificial reality, such actions may allow system 100 to solve the one or more tasks to achieve one or more objectives in a computer game. Such actions may include, e.g., a movement action (e.g., left, right, forward, backward, up, down, jump, etc.) or a command to interact with the environment (e.g., move, build, attack, harvest, interact with, etc.). As another example, where system 100 is implemented within a robot or drone, such actions may include an action to interact with the environment via one or more tools, sensors, appendages, etc. As another example, where system 100 is implemented within a computing device, such actions may allow system 100 to implement a personal digital assistant. Machine learning model 112 may output other types of labels or perform other types of actions relevant within a domain for which machine learning system 102 is deployed.

Although described primarily with respect to reinforcement learning algorithms, machine learning system 102 may implement other types of learning networks in accordance with the techniques of the disclosure. For example, machine learning system 102 may be a supervised leaning system, a classification learning system, a regression learning system, a self-supervised learning system, or a semi-supervised learning system, etc.

In accordance with the techniques of the disclosure, system 100 implements generative memory 104 to generate advice 124 in the form of training data for training machine learning system 102 to output labels 122 within an environment in response to new input tasks 120 for which machine learning model 112 has not previously been trained. Using the techniques described herein, generative memory 104 allows for the sampling of auxiliary data for learned tasks and the consolidation of such sampled, auxiliary data with input data for unlearned tasks so as to train machine learning model 112 of machine learning system 102 to generate output labels, such as action sequences, for solving the previously-unlearned tasks. Furthermore, generative memory 104 enables the iterative consolidation of auxiliary data for learned tasks with the input data for unlearned tasks so as to increase the speed at which machine learning model 112 may learn solutions for new tasks while reducing the occurrence of catastrophic forgetting of solutions for previously-learned tasks when learning the solutions for new tasks.

In an example in which system 100 performs training of machine learning model 112, generative memory 104 receives input data 120 as training data defining one or more tasks. The training data comprises a plurality of pairs of training inputs and training labels. Generative memory 104 assigns one or more of the training inputs to each archetype task of a plurality of archetype tasks 106A-106N (hereinafter, "archetype tasks 106"). Each archetype task 106 is representative of a cluster of related tasks 106 within a task space. Generative memory 104 may assign, to each archetype task 106, training inputs for input tasks that are similar to the cluster of related tasks 108 for the archetype task 106.

In some examples, generative memory 104 applies a clustering algorithm to identify clusters of related tasks 108. For example, tasks may be clustered together based on similar inputs, similar output labels, similar data types, etc. Generative memory 104 processes each cluster of related tasks 108 to generate an archetype task 106 for the cluster of related tasks that is representative of the cluster of related tasks 108.

Further, generative memory 104 assigns, to each archetype task 106, a skill 116. In some examples, machine learning model 112 applies skill 116 to the input data 120 to generate labels 122. In some examples, machine learning model 112 applies skill 116 to the input data 120 to obtain an action sequence for solving the cluster of related tasks 108 represented by the corresponding archetype task 106.

Furthermore, generative memory 104 generates, from each archetype task 106, auxiliary data 114. For example, generative memory 104 generates auxiliary inputs (e.g., random noise). Generative memory 104 assigns one or more of the auxiliary inputs to each archetype task 106 of the plurality of archetype tasks 106. Generative memory 104 applies a skill 116 for each archetype task 106 to the auxiliary inputs to obtain auxiliary labels. Generative memory 104 generates auxiliary data 114 from pairs of the auxiliary inputs and corresponding auxiliary labels.

Machine learning system 102 receives input data 120 and auxiliary data 114. Machine learning system 102 trains machine learning model 112 to apply, for each archetype task 106, skill 116 assigned to archetype task 106 to the training inputs and auxiliary inputs assigned to the archetype task 106 to obtain output labels 122 that correspond to the training labels associated with the training inputs assigned to the archetype task 106 and the auxiliary labels associated with the auxiliary inputs assigned to the archetype task 106. In this fashion, machine learning system 102 trains machine learning model 112 to obtain labels for the tasks defined by the training data. Further, the use of the auxiliary data in training machine learning model 112 may enable decreasing the time required for machine learning model 112 to learn new tasks.

Machine learning system 102 may iteratively train machine learning model 112 with input data and auxiliary data, regenerate the auxiliary data, and repeat so as to incrementally update the archetype tasks and associated skills for use in solving input tasks. In this fashion, machine learning model 112 is capable of scalable learning to decrease the amount of time and number of training examples needed to learn solutions for tasks.

Subsequently, system 100 may receive input data 120 that comprises a plurality of inputs. This input data 120 may be for a new task not previously learned by machine learning system 102. As described in more detail below, generative memory 104 selects one or more archetype tasks 106 most similar to the task for input data 120 and obtains one or more skills 116 for the one or more archetype tasks 106 most similar to the task for input data 120. In some examples, generative memory 104 excludes skills for archetype tasks 106 that are dissimilar to the task for input data 120. Machine learning model 112 applies the one or more skills 116 to the plurality of inputs to obtain one or more output labels 122 for the plurality of inputs. In this fashion, machine learning model 112 is capable of scalable learning to obtain labels for new tasks for which machine learning model 112 has not previously been trained.

The techniques of the disclosure provide specific improvements to the computer-related field of machine learning that have practical applications. For example, the techniques disclosed herein may enable more efficient training of machine learning systems, such as reinforcement learning systems. Furthermore, the techniques disclosed herein may enable more efficient use of the memory of the machine learning system, thereby allowing for a reduction in the size of the memory of the machine learning system. Furthermore, the techniques disclosed herein may enable a machine learning system to perform scalable, lifelong learning of solutions for new tasks the machine learning system has not previously been trained to solve, while reducing the occurrence of catastrophic forgetting (e.g., forgetting solutions to old tasks as a result of learning solutions to new tasks). Accordingly, the techniques disclosed herein may increase the accuracy and efficiency of machine learning systems in solving actions for a wide variety of new and old tasks in an environment.

Figure 2:
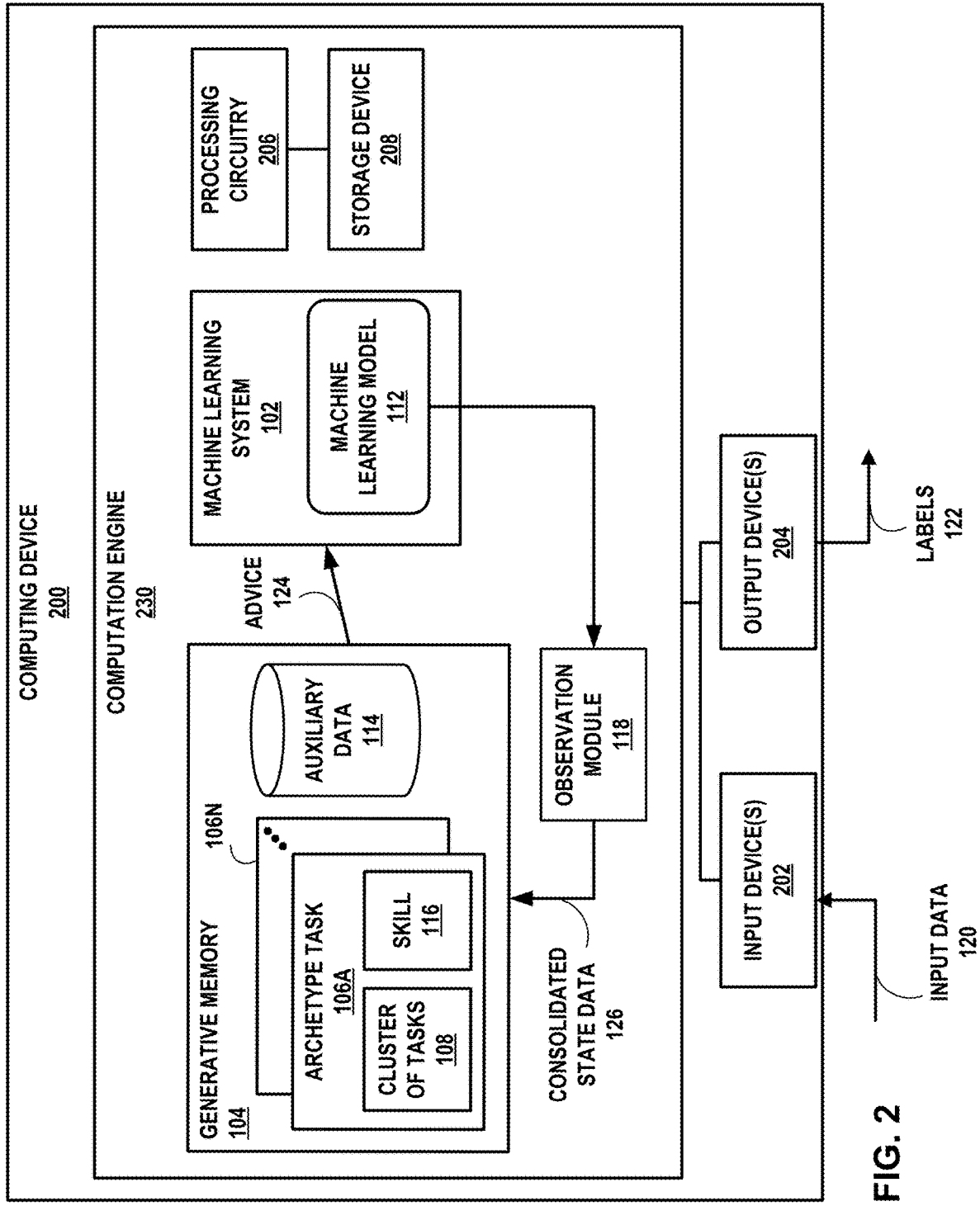
FIG. 2 is a block diagram illustrating an example computing device configured to execute the system of FIG. 1 in accordance with the techniques of the disclosure.

FIG. 2 is a block diagram illustrating example computing device configured to execute the system of FIG. 1 in accordance with the techniques of the disclosure. In the example of FIG. 2, computing device 200 includes computation engine 230, one or more input devices 202, and one or more output devices 204.

Computing device 200 receives input data 120 via one or more input devices 202. Input devices 202 may include a keyboard, pointing device, voice responsive system, video camera, biometric detection/response system, button, sensor, mobile device, control pad, microphone, presence-sensitive screen, network, or any other type of device for detecting input from a human or machine.

Computation engine 230 includes machine learning system 102, observational module 118 and generative memory 104. Each of machine learning system 102, observational module 118, and generative memory 104 may represent software executable by processing circuitry 206 and stored on storage device 208, or a combination of hardware and software. Such processing circuitry 206 may include any one or more of a microprocessor, a controller, a digital signal processor (DSP), an application specific integrated circuit (ASIC), a field-programmable gate array (FPGA), or equivalent discrete or integrated logic circuitry.

Furthermore, computation engine 230 may portions of machine learning system 102, observational module 118 and generative memory 104 on storage device 208. Storage device 208 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. In some examples, at least a portion of computing device 200, such as processing circuitry 206 and/or storage device 208, may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

In accordance with the techniques of the disclosure, system 100 receives input data 120 that comprises a plurality of inputs. The input data 120 may be for a new task not previously learned by machine learning system 102. Generative memory 104 selects one or more archetype tasks 106 most similar to the task for input data 120 and obtains one or more skills 116 for the one or more archetype tasks 106 most similar to the task for input data 120.

In some examples, generative memory 104 includes a plurality of variational auto-encoders (VAEs). Each VAE is mapped to a corresponding archetype task 106 and comprises one or more encoders and one or more decoders. Generative memory 104 may apply each VAE to a corresponding archetype task 106 to create a model of the cluster of tasks 108 represented by the archetype task 106. Thus, as a function of an embedding of a VAE corresponding to the archetype task 106 and a skill 116 assigned to the archetype task 106, generative memory 104 may use the VAE to determine a similarity score between a task for input data 120 and the archetype task 106. For example, the one or more encoders encode the plurality of inputs into latent space data, while the one or more decoders decode the latent space data into the similarity score between the task for the plurality of task inputs and the archetype task 106. In some examples, generative memory 104 may determine, for each archetype task 106 and using the VAE corresponding to the archetype task 106, a confidence in the similarity score between the task for the input data and archetype task 106.

In some examples, generative memory 104 generates the auxiliary data such that a quantity of the auxiliary data generated for each archetype task 106 is proportional to the similarity score between the task for the input data and archetype task 106. For example, generative memory 104 may sample auxiliary data for each archetype task 106 in proportion to the vector of similarities τ between the input data and the archetype task 106. In some examples, generative memory 104 may select each archetype task 106 of the plurality of archetype tasks 106, and obtain a quantity of auxiliary data associated with each archetype task 106 proportional to the confidence in the similarity between the new task 120 and the associated archetype task 106. Machine learning system 102 may train machine learning model 112 with both the plurality of inputs of input data and the plurality of auxiliary inputs of the auxiliary data in proportion to the similarity score between the task for the input data and each archetype task 106 to solve the task for the input data.

Machine learning model 112 applies the one or more skills 116 to the plurality of inputs to obtain one or more output labels 122 for the plurality of inputs of input data 120. In some examples, output labels 122 comprise one or more action sequences for solving a task defined by input data 120. In some examples, the task defined by input data 120 is a new task not previously learned by machine learning model 112. In this fashion, machine learning model 112 is capable of scalable learning to obtain labels for new tasks for which machine learning model 112 has not previously been trained.

In some examples, output device 204 is configured to output, for presentation to a user, information pertaining to machine learning system 102. For example, output device 204 may output an indication of labels 122, such as an indication of one or more action sequences for solving a task for input data 120. Output device 204 may include a display, sound card, video graphics adapter card, speaker, presence-sensitive screen, one or more USB interfaces, video and/or audio output interfaces, or any other type of device capable of generating tactile, audio, video, or other output. Output device 204 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 204 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 204 may include a presence-sensitive display that may serve as a user interface device that operates both as one or more input devices and one or more output devices.

In the example of FIG. 2, machine learning system 102 implements a reinforcement learning system. However, in other examples, machine learning system 102 may implement other types of supervised or unsupervised machine learning. Typically, a reinforcement learning system trains a reinforcement learning model to perform one or more actions in pursuit of achieving an input task. The input task is associated with a high positive reward. Each action may be associated with a small, negative reward. Further, environmental hazards may be associated with negative rewards of varying sizes. Actions taken by the reinforcement learning model result in a positive or negative reward, which depends on whether system 100 accomplished the input task and how many environmental hazards were encountered.

Observation module 118 consolidates input data 120 (e.g., a plurality of inputs paired with a plurality of labels 122 in the form of actions taken by machine learning model 112 in response to input data 120) and a resulting reward into consolidated state data 126 for processing by generative memory 104. Consolidated state data 126 may be in the form of an experiential episode tuple (e.g., input task 120, action 122, and a result that machine learning model 112 obtained). By evaluating multiple actions in response to multiple input tasks and input states, machine learning system 102 may train machine learning model 112 to maximize a reward for given input data 120. In this fashion, generative memory 102 may update training data and auxiliary data for each archetype task 106 with an observed state and a reward resulting from performing the action sequence for solving the one or more tasks.

Figure 3:
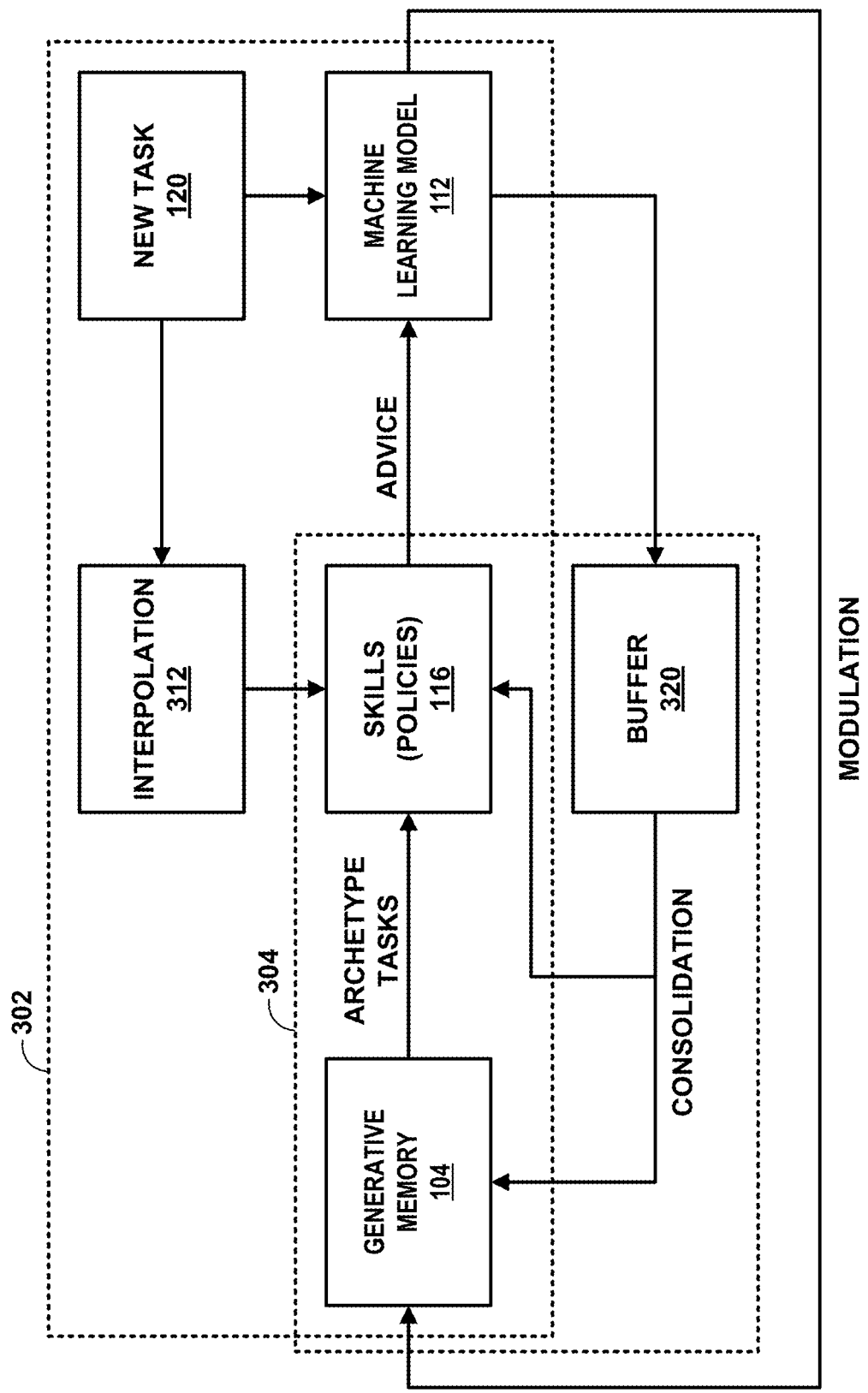
FIG. 3 is a block diagram illustrating another example system for training a machine model using a generative memory in accordance with the techniques of the disclosure.

FIG. 3 is a block diagram illustrating another example system for training a machine learning model using a generative memory in accordance with the techniques of the disclosure.

In some examples, system 100 may operate in a "wake" phase 302 and a "sleep" phase 304. During "wake" phase 302, system 100 may optimize machine learning model 112 to generate solutions to a novel input task, while during "sleep" phase 304, system 100 may optimize machine learning model 112 to consolidate and generate solutions for old tasks (e.g., compute solutions to archetype tasks) while system 100 is offline.

During wake phase 302, input device 202 receives input data 120 for a new task. The input data comprises a plurality of task inputs. Generative memory 104 selects, based on the plurality of task inputs, an archetype task 106 of the plurality of archetype tasks 106. Generative memory 104 obtains a skill 116 assigned to the archetype task 106 of the plurality of archetype tasks. Machine learning model 112 of FIG. 1 or 2), applies, to the plurality of auxiliary inputs and the plurality of task inputs for the input task, the skill 116 assigned to the archetype task 106 to obtain a plurality of task labels for solving the new task.

Generative memory 104 applies interpolation 312 to input data 120 and auxiliary data 114 to form consolidated training data, the consolidated training data comprising a plurality of consolidated inputs from the plurality of inputs and the plurality of auxiliary inputs paired with a plurality of consolidated labels from the plurality of input labels and the plurality of auxiliary labels. Machine learning system 102 trains machine learning model 112 with the consolidated training data, to, e.g., apply the skill 116 assigned to the archetype task 106 to the consolidated training inputs assigned to the archetype task 106 to obtain one or more output labels to solve the new task for input data 120. In some examples, machine learning system 102 gradually decreases a number of the one or more auxiliary inputs and increases a number of the one or more inputs over time so as to gradually train machine learning model 112 to solve the new task.

In some examples, one or more results of actions performed by machine learning model 112 may be stored in buffer 320 for consolidation into generative memory 104 during the sleep phase. Generative memory 104 may operate in the "wake" phase while buffer 320 is not full.

During sleep mode 304, input device 202 receives input data for a new task 120. The input data comprises a plurality of inputs and a plurality of labels associated with each of the plurality of inputs. Generative memory 104 assigns one or more inputs of the plurality of inputs of new task 120 to each archetype task 106.

Generative memory 102 assigns one or more of the plurality of inputs to each archetype task of the plurality of archetype tasks. For each archetype task 106, generative memory 102 generates, from the archetype task 106, auxiliary data comprising a plurality of auxiliary inputs. Generative memory 102 applies, to the plurality of auxiliary inputs, a skill 106 assigned to the archetype task 106 to obtain one or more auxiliary labels for the plurality of auxiliary inputs. Further, generative memory 102 updates an assignment of each of the plurality of auxiliary inputs to each archetype task 106. Generative memory 102 reapplies, for each archetype task 106, the auxiliary inputs to the skill assigned to the archetype task 106 to update the auxiliary labels. In this fashion, generative memory 102 may iteratively regenerate, from the updated auxiliary inputs and the updated auxiliary labels, updated auxiliary data comprising a plurality of pairs of the updated auxiliary inputs and the updated auxiliary labels. Machine learning model 112 applies skill 116 of the plurality of skills 116 assigned to the archetype task 116 of the plurality of archetype tasks 116 to the plurality of inputs to obtain one or more output labels 122 that correspond to the plurality of labels.

An example operation to perform "sleep phase" 304 is set forth below:
Having a full buffer of recent experiences:
1. Consolidate memory into archetype tasks (task basis)
   a. Sample old data from memory;
   b. Combine with buffer data to form the training set for memory; and
   c. train generative model 102 that separates the data into clusters of similar states and can generate novel examples of each cluster
2. Learn one skill (policy) per archetype task
   a. sample states from archetype task
   b. Use simulator to optimize policy An example operation to perform "wake phase" 302 is set forth below:
While the buffer is not full:
1. Observe input state s in the current (possibly novel) task;
2. Calculate task similarity with each archetype task;
3. Sample auxiliary states S from archetype tasks proportional to the similarity of each archetype task to the input task;
4. Interpolate input state s with each auxiliary state S to get consolidated states S';
5. Execute skills on consolidated states S' to get action sequence A;
6. Execute action sequence A on the new task and use the observed reward and state sequence for training machine learning model 112; and
7. Store the observed state and reward sequence in the buffer.

Figure 4:
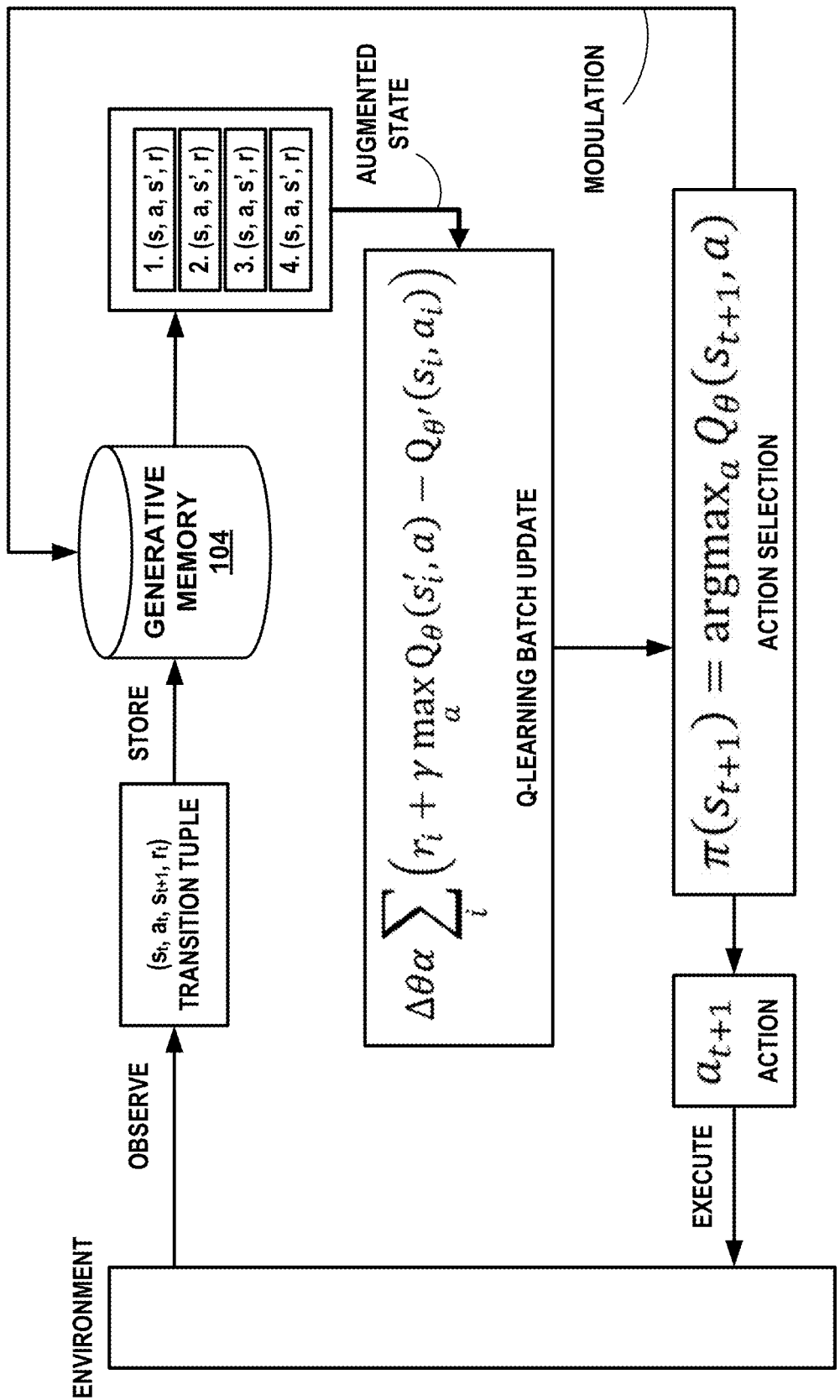
FIG. 4 is a block diagram illustrating another example system for training a reinforcement learning model using a generative memory in accordance with the techniques of the disclosure.

FIG. 4 is a block diagram illustrating another example system for training a reinforcement learning model using a generative memory in accordance with the techniques of the disclosure. For convenience, FIG. 4 is described with respect to the system of FIGS. 1 and 2.

As depicted in the example of FIG. 4, system 100 receives input data comprising a plurality of inputs. In some examples, the input data is observational data from an environment and is in the form of a transition tuple. The input data may define a new task not previously learned by machine learning system 102. Generative memory 104 selects one or more archetype tasks 106 most similar to the task for input data 120 and obtains one or more skills 116 for the one or more archetype tasks 106 most similar to the task for input data 120.

In some examples, generative memory 104 comprises a plurality of VAEs. Each VAE comprises at least one encoder and at least one decoder and is mapped to a corresponding archetype task 106. Generative memory 104 may apply each VAE to a corresponding archetype task 106 to create a model of the cluster of tasks 108 represented by the archetype task 106. For example, at least one encoder of each VAE encodes inputs for a task (e.g., task inputs) into latent space data, and the at least one decoder decodes the latent space data into, e.g., a similarity score between the task for the inputs and the archetype task. Thus, generative memory 104 may use the VAE to determine a similarity between a task for input data 120 and the cluster of tasks 108 represented by the archetype task 106. For example, generative memory 104 may sample a $\tau$ distribution defined by $$\tau = softmax\left(\frac{\Phi(z_i)}{\max_j \Phi(zj)}\right)$$

to determine a similarity of an archetype task 106 to the task for input data 106. In the foregoing equation, $z_i$ is a latent space embedding of the input data according to an ith VAE corresponding to an ith archetype task 106 of a plurality of archetype tasks, $\Phi$ is a density function of a standard normal distribution used as the prior in the VAE, and $\tau$ is a vector of similarities between the input data and the archetype task. Generative memory 104 may select one or more archetype tasks 106 that are most similar to the task for input data 106.

In some examples, generative memory 104 may determine, for each archetype task 106 and using the VAE corresponding to the archetype task 106, a confidence in the similarity between the task for the input data and archetype task 106. For example, given n generators and discriminators and n archetype tasks, generative memory 104 minimizes the r-weighted generative and discredited loess over all tasks previously observed. In some examples, to determine the confidence in the similarity between the task for the input data and archetype task 106, generative memory 104 applies, to the plurality of inputs, a loss function. Generally, the loss function may be defined by the following equation:

$$E_{x,y}[E_{\tau(x)}[L_G(x,g(\in))+L_d(y,d(y|g(\in)))]]$$

In the foregoing equation, g: $\in \to X$ is a generative model of inputs, $\tau$: $X \to [0, 1]$ inputs where a skill is applicable, and d: $X \to Y$ is a policy or skill to execute. In some examples, a specific implementation of the loss function instantiated with VAEs is defined by the following equation:

$$\min_{\theta,\phi} E_{x,y}\Big[E_\tau\big[E_{q_\phi(z|x)}[\log p_\theta(x|z)] - D_{KL}[q_\phi(z|x), p(z)] + \log p_\psi(y|z)\big] +$$

$$\lambda \sum_{i,j} |\cos(L\mu_i, \mu_j)|\Big]$$

In some examples, another specific implementation of the loss function instantiated with VAEs is defined by the following equation:

$$\min_{\theta,\phi} E_{x,y}\Big[E_\tau\big[E_{q_\phi(z|x)}[\log p_\theta(x|z)] - D_{KL}[q_\phi(z|x), p(z)] + \log p_\psi(y|\hat{x})\big] +$$

$$\lambda \sum_{i,j} |\cos(L\mu_i, \mu_j)|\Big]$$

In the foregoing equation, $\phi$ is a parameter of one or more encoders of the VAE corresponding to the archetype task, $\theta$ is a parameter of one or more decoders of the VAE corresponding to the archetype task, $g_\phi$ is a probability density defined jointly by each of the one or more encoders of the VAE corresponding to the archetype task, $p_\theta$ is a probability density defined jointly by each of the one or more decoders of the VAE corresponding to the archetype task, z is the latent space, x is the task for the input data, $D_{KL}$ is the Kullback-Leibler divergence of $q_\phi(z|x)$ and $p_\theta(z)$, $E_{q_\phi(z|x)}$ is an expectation of a quantity of (z|x) with respect to random variable z conditioned on x, whose density is $q_\phi$, w is a task similarity (weight) vector, $\lambda$ is a hyperparameter controlling weight of a cosine loss term, i is an index of a first VAE of the plurality of VAEs, j is an index of a second VAE of the plurality of VAEs, $\mu_i$ is a mean vector of VAE i, and $\mu_j$ is a mean vector of VAE j.

In some examples, generative memory 104 generates auxiliary data from each archetype task 106 of the plurality of archetype tasks 106. For example, generative memory 106 generates a plurality of auxiliary inputs. The plurality of auxiliary inputs may be, e.g., random noise. Generative memory 106 applies the plurality of auxiliary inputs to a skill 116 of each archetype task 106 to obtain a plurality of auxiliary labels. Generative memory 106 pairs each auxiliary input with a corresponding auxiliary label to form auxiliary data comprising a plurality of pairs of the auxiliary inputs and auxiliary labels. In some examples, generative memory 106 obtains a quantity of the auxiliary data generated for each archetype task 106 in proportion to the vector of similarities τ between the input data and the archetype task. Machine learning system 102 may train machine learning model 112 with both the input data 120 (e.g., comprising a plurality of pairs of training inputs and training labels) and the auxiliary data (e.g., comprising a plurality of pairs of the auxiliary inputs and auxiliary labels) to solve the task for the input data. In some examples, generative memory 104 may use the auxiliary data as supplemental training data to train another machine learning system not depicted in FIG. 4 to solve the task for the input data.

Machine learning model 112 applies the one or more skills 116 to the plurality of task inputs to obtain one or more output labels 122 for the plurality of task inputs of input data 120. In some examples, output labels 122 comprise one or more action sequences for solving a task defined by input data 120. In some examples, the task defined by input data 120 is a new task not previously learned by machine learning model 112. In this fashion, machine learning model 112 is capable of scalable learning to obtain labels for new tasks for which machine learning model 112 has not previously been trained.

Figure 5:
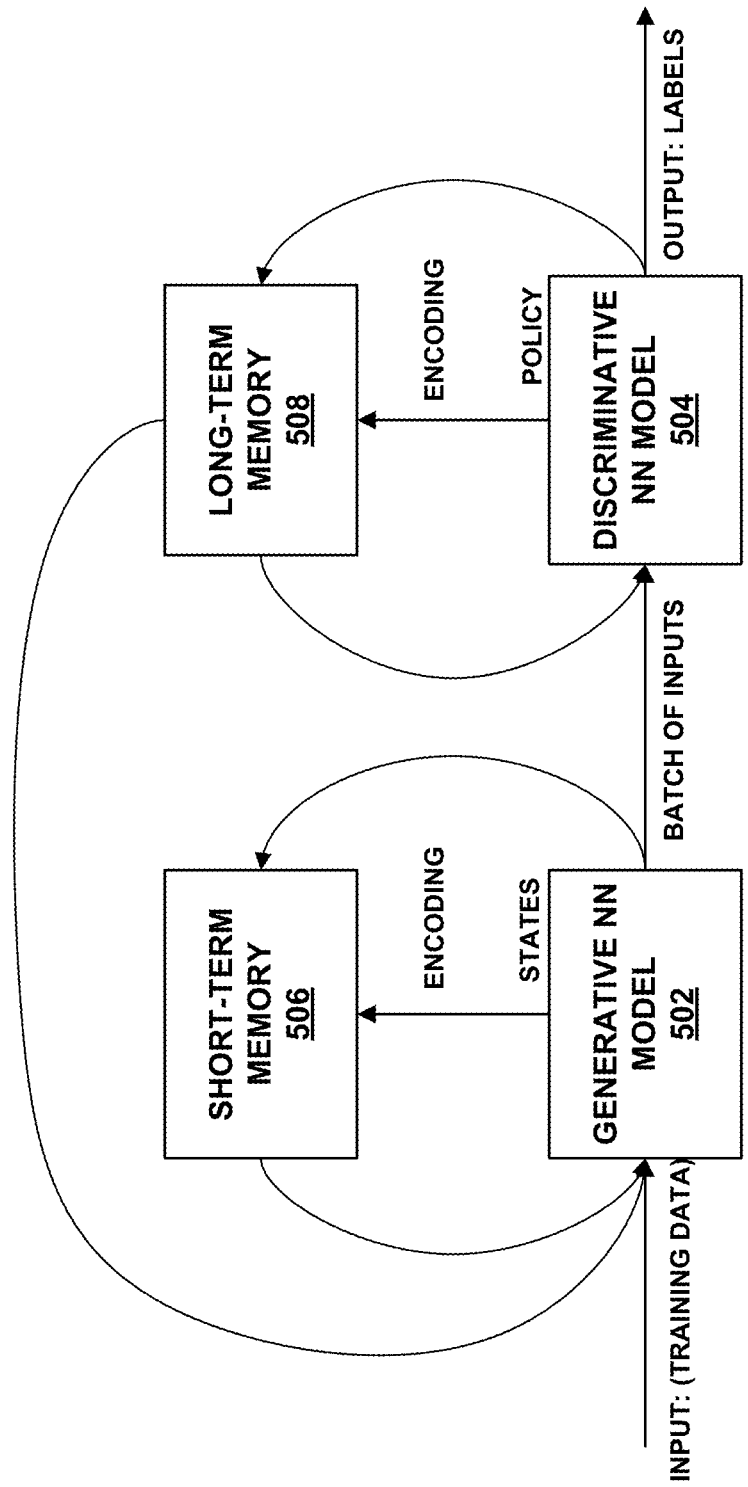
FIG. 5 is a block diagram illustrating an example learning process for the system of FIG. 1 in accordance with the techniques of the disclosure.

FIG. 5 is a block diagram illustrating an example learning process for the system of FIG. 1 in accordance with the techniques of the disclosure. For convenience, FIG. 5 is described with respect to the system of FIGS. 1 and 2.

In the example of FIG. 5, generative neural network model 502 receives, as an input, training data. The training data comprises a plurality of pairs of training inputs and training labels. Generative neural network model 502 may iteratively consolidate the training data with auxiliary data stored in the short-term memory 506, and encode states of the consolidated state data in short-term memory 506. Further, generative neural network model 502 may provide a batch of inputs consolidated from the training data and the auxiliary data of short-term memory 506 as inputs to discriminative neural network model 504.

Discriminative neural network model 504 iteratively consolidates the batch of inputs from generative neural network model 502 with auxiliary policies stored in long-term memory 508, and encode the consolidated policies in long-term memory 508. Further, discriminative neural network model 506 may apply policies and/or skills to the batch of inputs to obtain one or more labels. Discriminative neural network model 504 outputs the one or more labels to solve one or more tasks defined by the input training data.

Figure 6:
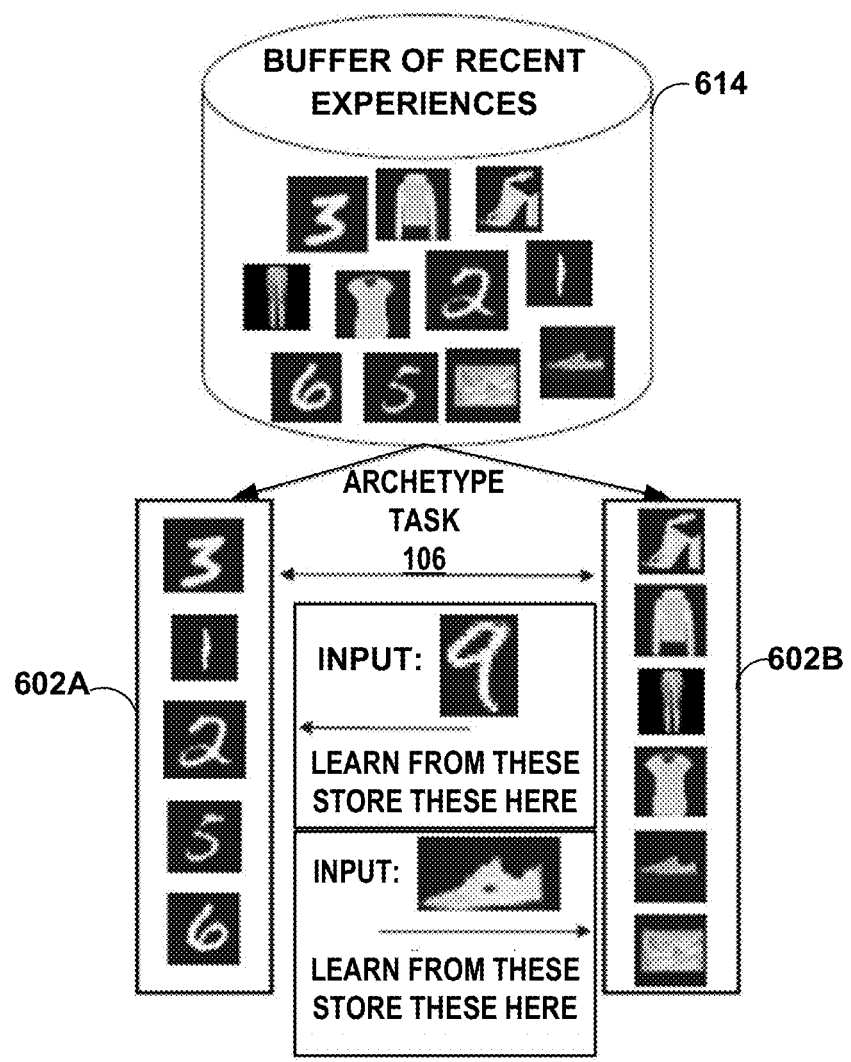
FIG. 6 is a block diagram illustrating an example process for creating archetype tasks in accordance with the techniques of the disclosure.

FIG. 6 is a block diagram illustrating an example process for creating archetype tasks in accordance with the techniques of the disclosure. Buffer 614 may be an example of auxiliary data 114 of FIG. 1. Buffer 614 includes state data across a task space. In the example of FIG. 6, the task space includes state data for image recognition of numbers and state data for image recognition of fashion apparel.

Generative memory 104 enforces task separation. Recent experiences may contain state data from multiple data sources (e.g., numbers and fashion apparel in the example of FIG. 6). Recalling all data from all sources may hurt accuracy during performance of a new task. Recalling only relevant state data may tremendously improve performance and learning by machine learning model 112. Recalling only a few, irrelevant items may be sufficient to avoid catastrophic forgetting. In the example of FIG. 6, generative memory 104 enforces task separation into a first latent space 602A (for state data for image recognition of numbers) and a second latent space 602B (for state data for image recognition of fashion apparel). Each latent space 601A, 602B includes a cluster of related tasks. For example, latent space 601A may include tasks for recognizing the numerals 1, 2, 3, 4, 5, 6, etc. As another example, latent space 601B may include tasks for recognizing shoes, shirts, pants, etc.

In some examples, a cluster of tasks may comprise one or more tasks having a different input but the same output. In some examples, a cluster of tasks may comprise one or more tasks having the same input but a different output. In some examples, a cluster of tasks may comprise one or more tasks that have different inputs and outputs but have feature or embedding similarity across a latent space.

An archetype task, such as archetype task 106 of FIG. 1, defines a cluster of related tasks from a task space. Further, an archetype task is associated with a skill for obtaining an action sequence for solving tasks from the cluster of related tasks defined by the archetype task. The solutions defined by the skill form a basis that machine learning system 102 may combine with other skills to solve new and novel tasks. As described in more detail below, generative memory 104 may determine whether an archetype task is relevant to an input task, and therefore whether a skill associated with the archetype task would be relevant to the input task. This comparison may allow generative memory 104 to alleviate forgetting.

In some examples, system 100 may operate in a "wake" phase and a "sleep" phase. During the "wake" phase, system 100 may optimize machine learning model 112 to generate solutions to a novel input task, while during the "sleep" phase, system 100 may optimize machine learning model 112 to consolidate and generate solutions for old tasks (e.g., compute solutions to archetype tasks) while system 100 is offline.

Figure 7:
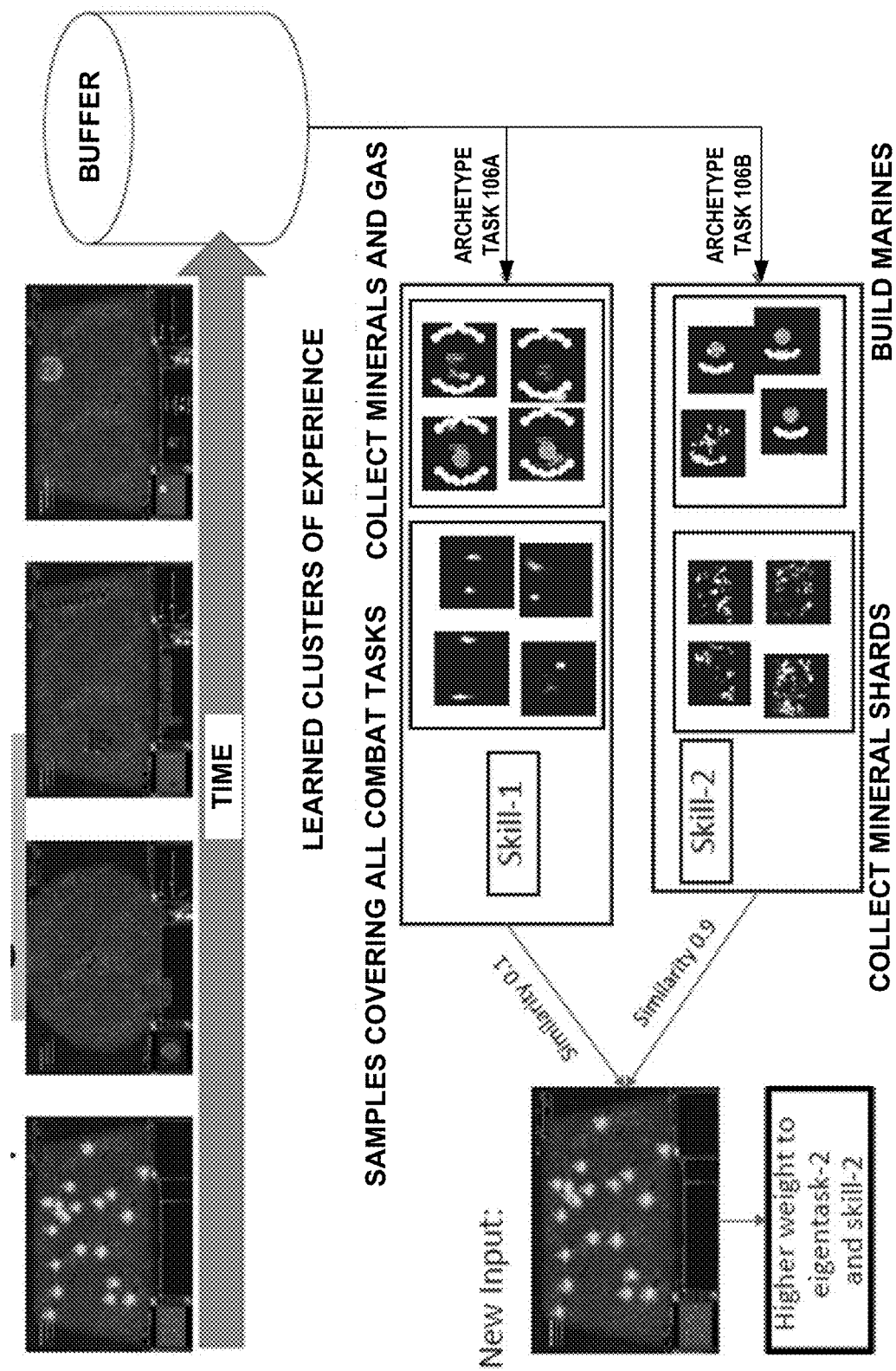
FIG. 7 is a block diagram illustrating another example process for creating archetype tasks in accordance with the techniques of the disclosure.

FIG. 7 is a block diagram illustrating another example process for creating archetype tasks in accordance with the techniques of the disclosure. For convenience, FIG. 7 is described with respect to FIGS. 1 and 2.

As described above, generative memory 102 generates auxiliary data comprising a plurality of pairs of auxiliary inputs and auxiliary labels from each archetype task 106 of the plurality of archetype tasks 106. As described in more detail below, generative memory 102 may sample a quantity of the auxiliary data generated for each archetype task 106 in proportion to the similarity score between the task for the task inputs and each archetype task.

As depicted in the example of FIG. 7, generative memory 102 identifies archetype tasks 106A and 106B as being similar to the input task. Further, generative memory 102 determines that archetype task 106A is about 10% similar to the input task (e.g., a similarity score of 90) and archetype task 106B is about 90% similar to the input task (e.g., a similarity score of 10). Therefore, generative memory 102 samples a quantity of the auxiliary data generated for each archetype task 106 that comprises about 10% auxiliary data from archetype task 106A and 90% auxiliary data from archetype task 106B. Machine learning system 102 may train machine learning model 112 with both the input data for a new task and the quantity of the auxiliary data generated for each archetype task 106A, 106B to train machine learning model 112 to solve the new task for the input data.

Figure 8:
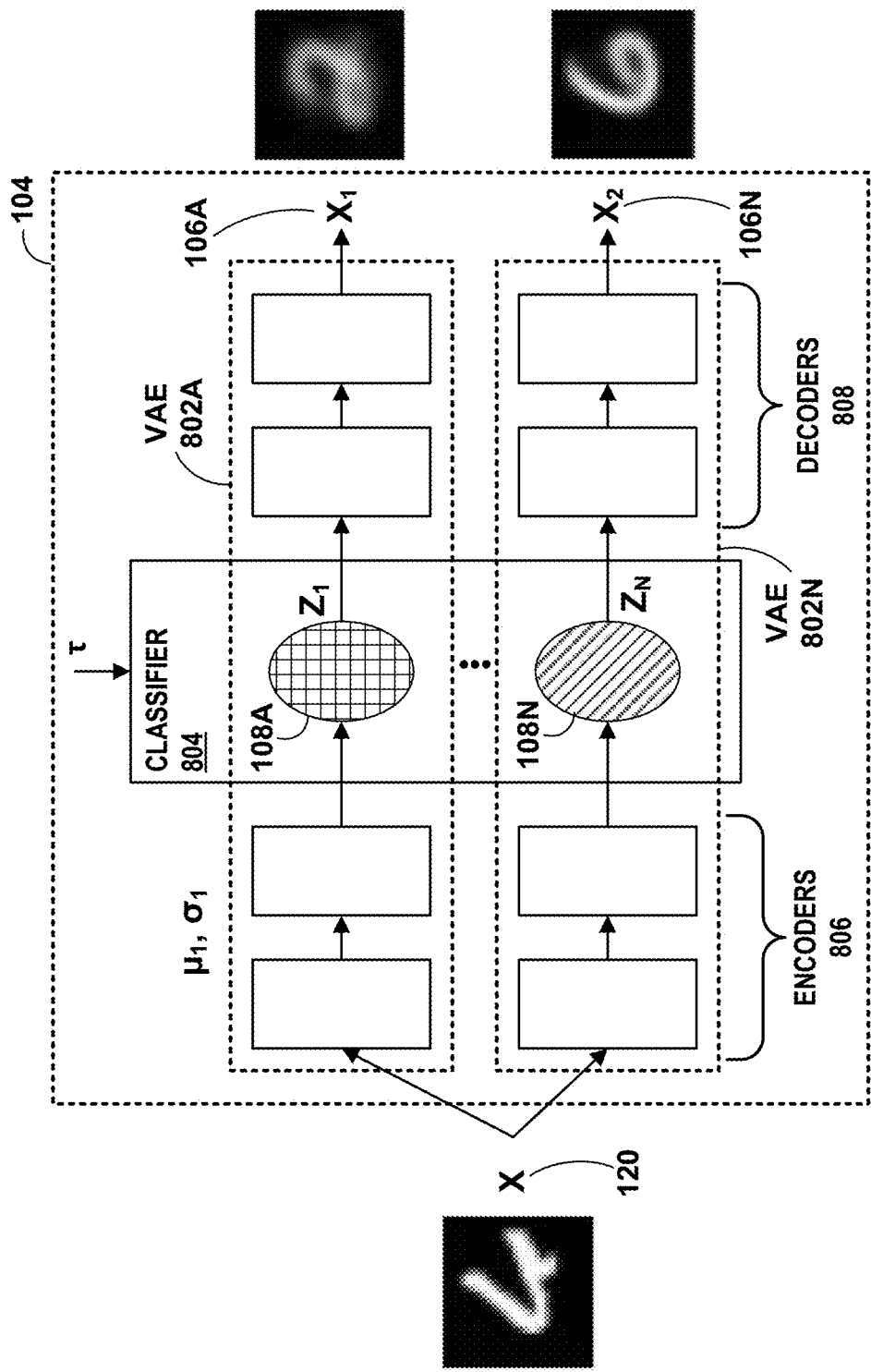
FIG. 8 is a block diagram illustrating example implementation of a generative memory that uses a plurality of variational auto-encoders (VAEs) to identify a similarity of a plurality of archetype tasks to an input task.

FIG. 8 is a block diagram illustrating example implementation of generative memory 104 that uses a plurality of variational auto-encoders (VAEs) 802A-802N (collectively, "VAEs 802") to identify a similarity of a plurality of archetype tasks 106 to an input task 120. Generative memory 104 comprises a plurality of encoders 806, classifier 804, and a plurality of decoders 808. Each VAE 802 comprises a set of encoders 806 that reduces a size of input task 120 to a smaller latent space, a classifier which classifies input task 120 into a subset of the latent space z (e.g., a cluster of related tasks 108), and a set of decoders 808 which reconstructs the subset of the latent space z into an archetype task 106 representative of the cluster of related tasks 108. For example, encoders 806 may encode the plurality of task inputs into latent space data, and decoders 808 decode the latent space data into the similarity score between the input task 120 for the plurality of task inputs and the archetype task 106. In some examples, each VAE 802 may determine a confidence in a similarity of the archetype task 106 to the input task 120.

Generative memory 104 enables sampling from a joint distribution over all tasks and instances, which enables scalable training of machine learning model 112 while reducing catastrophic forgetting. In some examples, generative memory 104 implements a generative machine learning model based on one or more VAEs. The use of a VAE allows for a more scalable memory subsystem beyond a simple first-in, first out (FIFO) cache used in typical reinforcement learning approaches. To directly address scalability, memory recall is agnostic to task labels. Generative memory 104 uses an embedding that enforces concept separation, e.g., by quantifying whether memories are similar or different so that the generative memory 104 may recall the memories at a subsequent time. In some examples, generative memory 104 enforces concept separation by applying an angle loss term $\lambda \Sigma_{i,j} |\cos(\angle \mu_i, \mu_j)|$ to the overall loss function set forth above.

Generative memory 104 is a generative memory that may learn concepts that are different as well as reinforcing concepts that are similar. Generative memory 104 of the present disclosure may separate the latent space (e.g., $z_1$ 108A and $z_N$ 108N in FIG. 8) for each encoder 806 in Generative memory 104. Using the $\lambda$ and $\theta$ parameters of the loss function above, generative memory 104 may enable lifelong learning whereby task embedding is accomplished in an unsupervised manner. Generative memory 104, as described herein, does not include additional parameters and supports smooth transition across the latent space for adaptation to surprises.

As described above, generative memory 104 selects, based on input task 120, an archetype task of a plurality of archetype tasks 106 that is most similar to input task 120. Each archetype task 106 is representative of a cluster of related tasks 108 from a task space. Further, each archetype task 106 is associated with a skill of a plurality of skills 116 for obtaining an action sequence for solving the cluster of related tasks 108 defined by the selected archetype task 106. Generative memory 104 further obtains auxiliary data associated with the selected archetype task 106. Generative memory 104 provides, to machine learning system 102, advice 124 in the form of the auxiliary data associated with the selected archetype task 106 and the skill 116 associated with the selected archetype task 106.

In some examples, generative memory 104 selects an archetype task 106 that is most similar to the input task 106 for use in training machine learning model 112. In some examples, generative memory 104 may apply the above loss function to select an archetype task 106. In some examples, generative memory 104 may determine, based on each confidence in similarity of the archetype task 106 to the input task 120 generated by each VAE 802, the archetype task 106 having the highest estimate of confidence in similarity of the archetype task 106 to the input task 120 and select such archetype task 106 and associated auxiliary data for training machine learning model 112 as described above. In some examples, generative memory 104 may select each archetype task 106 of the plurality of archetype tasks 106, and obtain a quantity of auxiliary data associated with each archetype task 106 proportional to the confidence in the similarity between the input task 120 and the associated archetype task 106.

Figure 9:
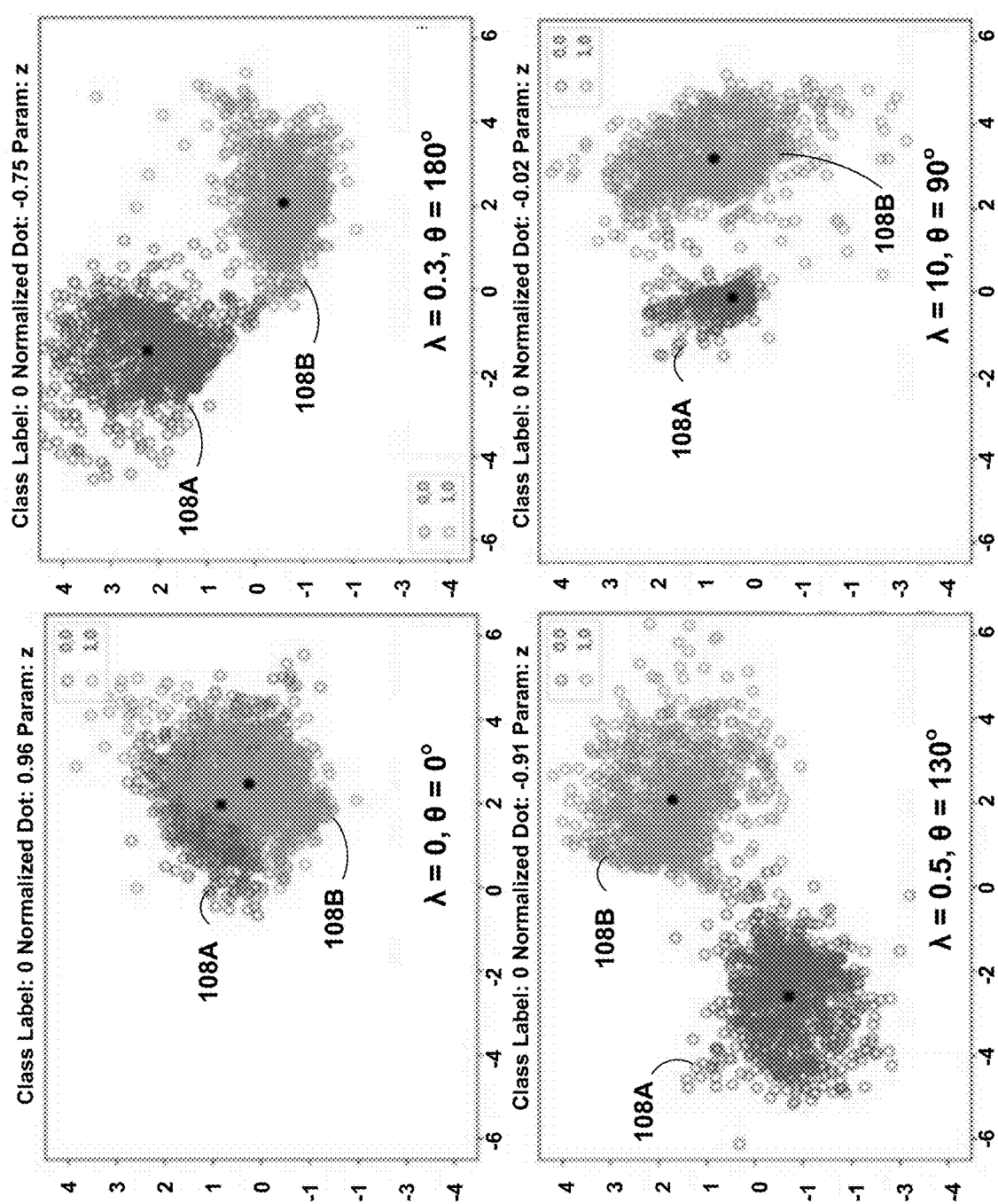
FIG. 9 is a chart illustrating clustering of related tasks in accordance with the techniques of the disclosure.

FIG. 9 is a chart illustrating clustering of related tasks 108 in accordance with the techniques of the disclosure. FIG. 9 provides a visualization of latent space with enforced separation using the $\lambda$, and $\theta$ parameters of the loss function set forth above. For example, as depicted in the example of FIG. 9, generative memory 104 applies the above loss function to enforce separation of the latent space z into clusters of related tasks 108A and 108N. FIG. 9 depicts various values for the $\lambda$, and $\theta$ parameters and the corresponding clustering of latent space z.

Figure 10:
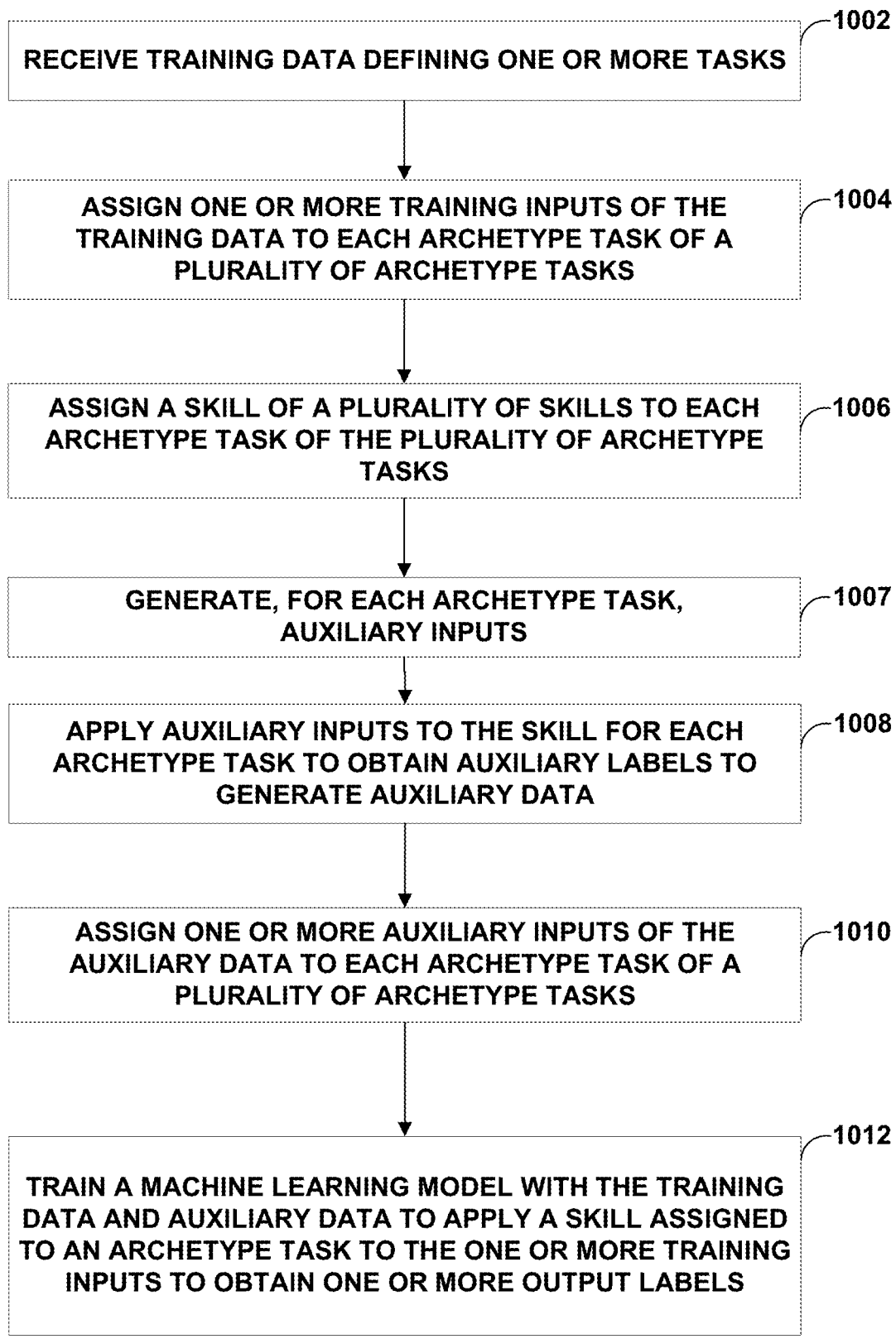
FIG. 10 is a flowchart illustrating an example operation in accordance with the techniques of the disclosure.

FIG. 10 is a flowchart illustrating an example operation in accordance with the techniques of the disclosure. Specifically, the operation of FIG. 10 depicts an example for training machine learning model 112 with training data comprising training inputs and training labels. FIG. 10 is described with respect to FIGS. 1 and 2 for convenience.

As depicted in the example of FIG. 10, input device 202 receives training input data 120 defining one or more tasks (1002). The training data comprises a plurality of pairs of training inputs and training labels. Each training input is associated with a corresponding training label.

Generative memory 104 assigns one or more training inputs of the plurality of training inputs to each archetype task 106 of a plurality of archetype tasks 106 (1004). Each archetype task 106 of a plurality of archetype tasks 106 is representative of a cluster of related tasks 106 within a task space. Further, generative memory 104 assigns to each archetype task of the plurality of archetype tasks, a corresponding skill of a plurality of skills (1006).

Furthermore, generative memory 104 generates, from each archetype task 106, auxiliary data 114. For example, generative memory 104 generates, for each archetype task 106, auxiliary inputs (1007). In some examples, the auxiliary inputs are, e.g., random noise. Generative memory 104 applies the auxiliary inputs to the skill 116 for each archetype task 106 to obtain auxiliary labels (1008). Generative memory 104 generates auxiliary data 114 from pairs of the auxiliary inputs and corresponding auxiliary labels. Generative memory 104 assigns one or more of the auxiliary inputs to each archetype task 106 of the plurality of archetype tasks 106 (1010).

Machine learning system 102 trains machine learning model 112 with the training data and auxiliary data to apply, for an archetype task 106 of the plurality of archetype tasks 106, skill 106 assigned to the archetype task 106 to the one or more training inputs and one or more auxiliary inputs assigned to the archetype task 106 to obtain one or more output labels 122 (1012). Specifically, machine learning system 102 trains machine learning model 112 with the training data and auxiliary data to obtain labels 122 that correspond to one or more training labels associated with the one or more training inputs assigned to the archetype task 106 as well as one or more auxiliary labels associated with the one or more auxiliary inputs assigned to the archetype task 106. In this fashion, machine learning model 112 is capable of scalable learning to decrease the amount of time and number of training examples needed to learn solutions for tasks.

Figure 11:
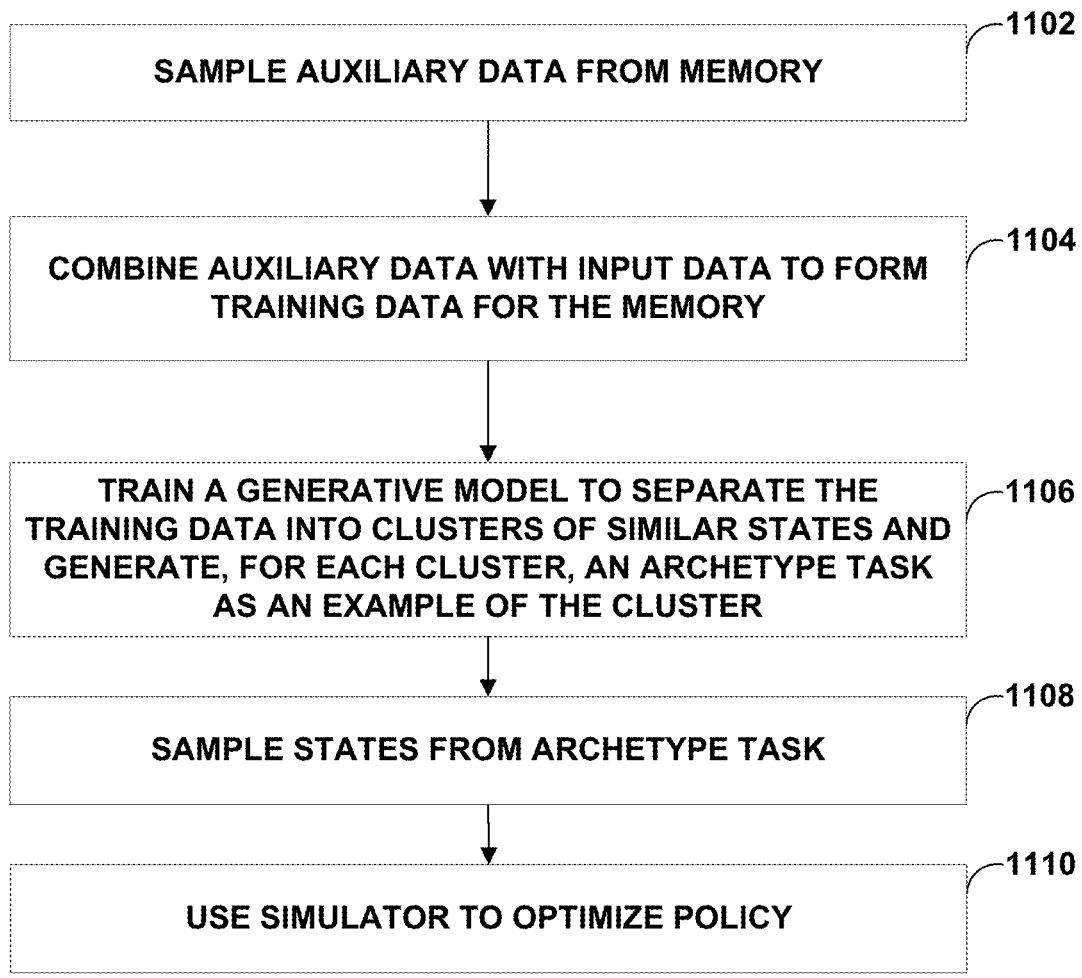
FIG. 11 is a flowchart illustrating an example operation in accordance with the techniques of the disclosure.

FIG. 11 is a flowchart illustrating an example operation in accordance with the techniques of the disclosure. Specifically, FIG. 11 illustrates an operation of a "sleep" phase of system 100 in accordance with the techniques of the disclosure. FIG. 11 is described with respect to FIG. 1 for convenience.

Generative memory 104 consolidates memory into archetype tasks (e.g., a "task basis"). To do this, generative memory 104 samples auxiliary data from memory (1102). In some examples, auxiliary data comprises a full buffer of recent experiences. Generative memory 104 combines auxiliary data with input data 120 to form training data for the memory (1104). Generative memory 104 trains a generative model to separate the training data into clusters of similar states and generates, for each cluster, an archetype task as an example of the cluster (1106). In some examples, the generative model is a machine learning model. For example, the generative machine learning model may process input data 120 and auxiliary data to obtain a plurality of clusters of related tasks from the task space.

Generative memory 104 learns one skill (e.g., policy) per archetype task. For example, generative memory 104 samples states from an archetype task (1108). Further, generative memory 104 uses a simulator to optimize the policy of the sampled archetype task (1110). In some examples, the generative machine learning model generates, from each cluster of the plurality of clusters of related tasks, a corresponding archetype task 106 of the plurality of archetype tasks 106. In some examples, generative memory 104 associates, with each archetype task 106, a skill for obtaining an action sequence 122 for solving the cluster of related tasks 108 for the archetype task 106.

Figure 12:
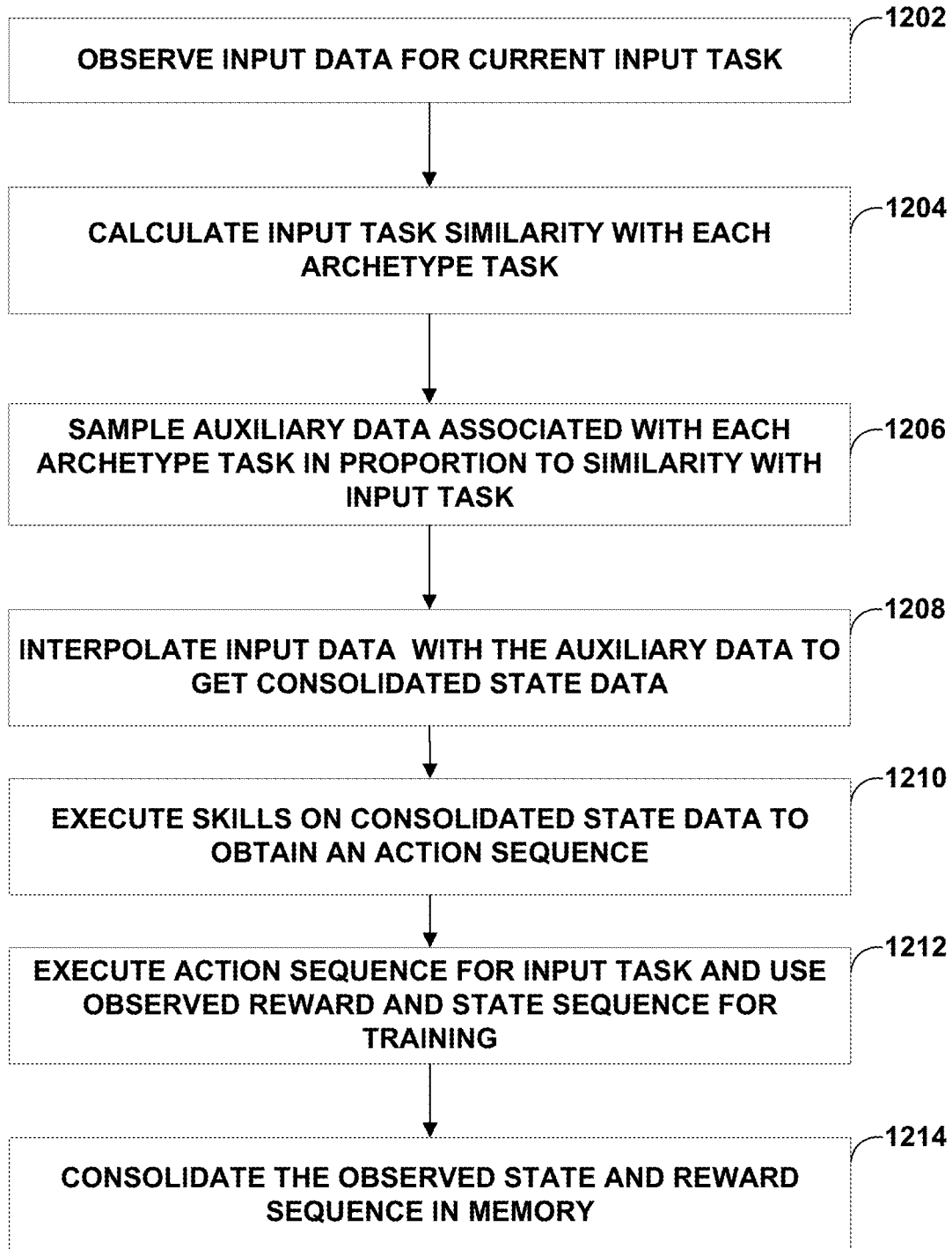
FIG. 12 is a flowchart illustrating an example operation in accordance with the techniques of the disclosure.

FIG. 12 is a flowchart illustrating an example operation in accordance with the techniques of the disclosure. Specifically, FIG. 12 illustrates an operation of a "wake" phase of system 100 in accordance with the techniques of the disclosure. FIG. 12 is described with respect to FIG. 1 for convenience.

Generative memory 104 may operate in the "wake" phase while the buffer is not full. For example, generative memory 104 observes input data 120 defining a current task (1202). The current input task 120 may be novel, e.g., a task for which machine learning system 102 has previously not been trained. Generative memory 104 calculates a similarity of input task 120 with each archetype task 106 (1204). Generative memory 104 samples auxiliary data associated with each archetype task 106 in proportion to the similarity of each archetype task 106 with input task 120 (1206).

Generative memory 104 interpolates input data 120 with the auxiliary data associated with each archetype task 106 to get consolidated state data (1208). Generative memory 104 provides the consolidated state data to machine learning system 102 as advice 124 for training machine learning model 112 to obtain an action sequence 122 for solving input task 120. Machine learning model 112 executes the skills associated with archetype tasks 106 on the consolidated state data to obtain one or more labels 122. In an example where machine learning model 112 is a reinforcement learning model, machine learning model 112 executes the skills associated with archetype tasks 106 on the consolidated state data to obtain an action sequence 122 (1210). Machine learning model 112 executes the action sequence 122 for input task 120 and uses an observed reward and state sequence for training (1210). Observation module 118 consolidates the observed state and reward sequence in generative memory 104 (1214).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising:
an input device configured to receive training data defining one or more tasks, wherein the training data comprises a plurality of pairs of training inputs and training labels;
a computation engine comprising processing circuitry, wherein the computation engine is configured to execute a generative memory configured to:
assign one or more of the training inputs to each archetype task of a plurality of archetype tasks, wherein each archetype task of the plurality of archetype tasks is representative of a cluster of related tasks within a task space;
assign, to each archetype task of the plurality of archetype tasks, a corresponding skill of a plurality of skills;
generate, for each archetype task of the plurality of archetype tasks, auxiliary inputs;
apply, for each archetype task of the plurality of archetype tasks, the auxiliary inputs to the skill assigned to the archetype task to obtain auxiliary labels to generate, from the auxiliary inputs and the auxiliary labels, auxiliary data comprising a plurality of pairs of the auxiliary inputs and the auxiliary labels;
assign one or more of the auxiliary inputs to each archetype task of the plurality of archetype tasks; and
a machine learning system executed by the processing circuitry and configured to:
train a machine learning model with the training data and the auxiliary data to apply, for an archetype task of the plurality of archetype tasks, the skill of the plurality of skills assigned to the archetype task to the one or more training inputs assigned to the archetype task and the one or more auxiliary inputs assigned to the archetype task to obtain one or more output labels that correspond to one or more of the training labels and the auxiliary labels, wherein the one or more training labels are associated with the one or more training inputs assigned to the archetype task and wherein the one or more auxiliary labels are associated with the one or more auxiliary inputs assigned to the archetype task such that the generative memory is capable of generating the auxiliary data from old tasks for use in training the machine learning model to obtain labels for new tasks for which the machine learning model has not previously been trained.

2. The computing system of claim 1,
wherein the input device is further configured to receive a plurality of task inputs,
wherein the computation engine is further configured to execute a plurality of variational auto-encoders (VAEs), each VAE of the plurality of VAEs corresponding to each archetype task of the plurality of archetype tasks, and
wherein the generative memory is further configured to:
determine, for each archetype task of the plurality of archetype tasks and as a function of an embedding of a VAE corresponding to the archetype task and a skill assigned to the archetype task, a similarity score between a task for the plurality of task inputs and the archetype task;
select an archetype task of the plurality of archetype tasks that is most similar to the task for the plurality of task inputs; and
obtain the skill assigned to the archetype task that is most similar to the task for the plurality of task inputs,
wherein the machine learning model of the machine learning system is configured to apply the skill to the plurality of task inputs to obtain one or more task labels for the plurality of task inputs.

3. The computing system of claim 2, wherein each VAE of the plurality of VAEs comprises:
one or more encoders configured to encode the plurality of task inputs into latent space data; and
one or more decoders configured to decode the latent space data into the similarity score between the task for the plurality of task inputs and the archetype task.

4. The computing system of claim 2,
wherein to apply, for each archetype task of the plurality of archetype tasks, the auxiliary inputs to the skill assigned to the archetype task to obtain the auxiliary labels to generate the auxiliary data comprising a plurality of pairs of the auxiliary inputs and the auxiliary labels, the generative memory is configured to:
apply, for each archetype task of the plurality of archetype tasks, the auxiliary inputs to the skill assigned to the archetype task to obtain the auxiliary labels to generate a quantity of the auxiliary data for each archetype task of the plurality of archetype tasks in proportion to the similarity score between the task for the plurality of task inputs and the archetype task; and
wherein to train the machine learning model with the training data and the auxiliary data to apply, for the archetype task of the plurality of archetype tasks, the machine learning system is configured to:
train the machine learning model with the plurality of task inputs and the quantity of the auxiliary data for each archetype task of the plurality of archetype tasks in proportion to the similarity score between the task for the plurality of task inputs and the archetype task to solve the task for the plurality of task inputs.

5. The computing system of claim 2, wherein the generative memory is further configured to determine, for each archetype task of the plurality of archetype tasks, a confidence in the similarity score between the task for the plurality of task inputs and the archetype task by applying a loss function to the VAE corresponding to the archetype task.

6. The computing system of claim 1,
wherein the input device is further configured to receive a plurality of task inputs,
wherein the generative memory is further configured to:
select, based on the plurality of task inputs, a first archetype task of the plurality of archetype tasks;
obtain a first skill assigned to the first archetype task of the plurality of archetype tasks, and
wherein the machine learning model of the machine learning system is configured to apply the first skill assigned to the first archetype task to the plurality of task inputs to obtain one or more task labels for the plurality of task inputs to solve a task for the plurality of task inputs.

7. The computing system of claim 1,
wherein the input device is further configured to receive task data defining a new task,
wherein the task data comprises a plurality of pairs of task inputs and task labels, wherein the generative memory is further configured to:
assign one or more of the plurality of task inputs to each archetype task of the plurality of archetype tasks;
update an assignment of the one or more of the auxiliary inputs to each archetype task of the plurality of archetype tasks;
re-applying, for each archetype task of the plurality of archetype tasks, the one or more of the auxiliary inputs assigned to the archetype task to the skill assigned to the archetype task to update the auxiliary labels so as to regenerate, from the updated auxiliary inputs and the updated auxiliary labels, updated auxiliary data comprising a plurality of pairs of the updated auxiliary inputs and the updated auxiliary labels, and
wherein the machine learning model of the machine learning system is configured to apply the skill of the plurality of skills assigned to the archetype task of the plurality of archetype tasks to the plurality of task inputs to obtain one or more task labels to solve a task for the plurality of task inputs.

8. The computing system of claim 1,
wherein the machine learning model comprises a reinforcement learning model, and
wherein to train the machine learning model to apply, for the archetype task of the plurality of archetype tasks, the skill of the plurality of skills assigned to the archetype task to the one or more training inputs assigned to the archetype task and the one or more auxiliary inputs assigned to the archetype task to obtain the one or more output labels, the machine learning system is configured to:
train the machine learning model to apply, for the archetype task of the plurality of archetype tasks, the skill of the plurality of skills assigned to the archetype task to the one or more training inputs assigned to the archetype task and the one or more auxiliary inputs assigned to the archetype task to obtain an action sequence for solving the one or more tasks; and
perform the action sequence for solving the one or more tasks, and
wherein the generative memory is further configured to update the training data with an observed state and a reward resulting from performing the action sequence for solving the one or more tasks.

9. The computing system of claim 1, wherein the machine learning model is further configured to output an indication of the one or more output labels.

10. The computing system of claim 1,
wherein the one or more output labels comprise one or more action sequences for solving the one or more tasks, and
wherein the machine learning model is further configured to perform the one or more action sequences for solving the one or more tasks to:
navigate an autonomous vehicle through an environment;
pilot an unmanned aerial vehicle through an environment;
achieve one or more objectives in a computer game; or
implement a digital assistant.

11. A method comprising:
receiving, by an input device, training data defining one or more tasks, wherein the training data comprises a plurality of pairs of training inputs and training labels;
assigning, by a generative memory executed by a computation engine comprising processing circuitry, one or more of the training inputs to each archetype task of a plurality of archetype tasks, wherein each archetype task of the plurality of archetype tasks is representative of a cluster of related tasks within a task space;
assigning, by the generative memory and to each archetype task of the plurality of archetype tasks, a corresponding skill of a plurality of skills;
generating, by the generative memory and for each archetype task of the plurality of archetype tasks, auxiliary inputs;
applying, by the generative memory and for each archetype task of the plurality of archetype tasks, the auxiliary inputs to the skill assigned to the archetype task to obtain auxiliary labels to generate, from the auxiliary inputs and the auxiliary labels, auxiliary data comprising a plurality of pairs of the auxiliary inputs and the auxiliary labels
applying, by the generative memory and for each archetype task of the plurality of archetype tasks, auxiliary inputs to the skill assigned to the archetype task to obtain auxiliary labels to generate, from the auxiliary inputs and the auxiliary labels, auxiliary data comprising a plurality of pairs of the auxiliary inputs and the auxiliary labels;
assigning, by the generative memory one or more of the auxiliary inputs to each archetype task of the plurality of archetype tasks; and
training, by a machine learning system executed by the processing circuitry, a machine learning model with the training data and the auxiliary data to apply, for an archetype task of the plurality of archetype tasks, the skill of the plurality of skills assigned to the archetype task to the one or more training inputs assigned to the archetype task and the one or more auxiliary inputs assigned to the archetype task to obtain one or more output labels that correspond to one or more of the training labels and the auxiliary labels, wherein the one or more training labels are associated with the one or more training inputs assigned to the archetype task and wherein the one or more auxiliary labels are associated with the one or more auxiliary inputs assigned to the archetype task such that the generative memory is capable of generating the auxiliary data from old tasks for use in training the machine learning model to obtain labels for new tasks for which the machine learning model has not previously been trained.

12. The method of claim 11, further comprising:
receiving, by the input device, a plurality of task inputs,
executing, by the computation engine, a plurality of variational auto-encoders (VAEs), each VAE of the plurality of VAEs corresponding to each archetype task of the plurality of archetype tasks,
determining, by the generative memory and for each archetype task of the plurality of archetype tasks and as a function of an embedding of a VAE corresponding to the archetype task and a skill assigned to the archetype task, a similarity score between a task for the plurality of task inputs and the archetype task;
selecting, by the generative memory, an archetype task of the plurality of archetype tasks that is most similar to the task for the plurality of task inputs;
obtaining, by the generative memory, the skill assigned to the archetype task that is most similar to the task for the plurality of task inputs; and
applying, by the machine learning model, the skill to the plurality of task inputs to obtain one or more task labels for the plurality of task inputs.

13. The method of claim 12, wherein each VAE of the plurality of VAEs comprises:
one or more encoders configured to encode the plurality of task inputs into latent space data; and
one or more decoders configured to decode the latent space data into the similarity score between the task for the plurality of task inputs and the archetype task.

14. The method of claim 12,
wherein applying, for each archetype task of the plurality of archetype tasks, the auxiliary inputs to the skill assigned to the archetype task to obtain the auxiliary labels to generate the auxiliary data comprising a plurality of pairs of the auxiliary inputs and the auxiliary labels comprises:
applying, for each archetype task of the plurality of archetype tasks, the auxiliary inputs to the skill assigned to the archetype task to obtain the auxiliary labels to generate a quantity of the auxiliary data for each archetype task of the plurality of archetype tasks in proportion to the similarity score between the task for the plurality of task inputs and the archetype task; and
wherein training the machine learning model with the training data and the auxiliary data to apply, for the archetype task of the plurality of archetype tasks comprises:
training the machine learning model with the training data and the quantity of the auxiliary data for each archetype task of the plurality of archetype tasks in the proportion to the similarity score between the task for the plurality of task inputs and the archetype task to solve the task for the plurality of task inputs.

15. The method of claim 12, further comprising determining, by the generative memory and for each archetype task of the plurality of archetype tasks, a confidence in the similarity score between the task for the plurality of task inputs and the archetype task by applying a loss function to the VAE corresponding to the archetype task.

16. The method of claim 11, further comprising:
receiving, by the input device, a plurality of task inputs;
selecting, by the generative memory and based on the plurality of task inputs, a first archetype task of the plurality of archetype tasks;

obtaining, by the generative memory, a first skill assigned to the first archetype task of the plurality of archetype tasks, and
wherein the machine learning model of the machine learning system is configured to apply the first skill assigned to the first archetype task to the plurality of task inputs to obtain one or more task labels for the plurality of task inputs to solve a task for the plurality of task inputs.

17. The method of claim 11, further comprising:
receiving, by the input device, task data defining a new task, wherein the task data comprises a plurality of pairs of task inputs and task labels,
assigning, by the generative memory, one or more of the plurality of task inputs to each archetype task of the plurality of archetype tasks;
updating, by the generative memory, an assignment of the one or more of the auxiliary inputs to each archetype task of the plurality of archetype tasks;
re-applying, by the generative memory and for each archetype task of the plurality of archetype tasks, the one or more of the auxiliary inputs assigned to the archetype task to the skill assigned to the archetype task to update the auxiliary labels so as to regenerate, from the updated auxiliary inputs and the updated auxiliary labels, updated auxiliary data comprising a plurality of pairs of the updated auxiliary inputs and the updated auxiliary labels, and
applying, by the machine learning model, the skill of the plurality of skills assigned to the archetype task of the plurality of archetype tasks to the plurality of task inputs to obtain one or more task labels to solve a task for the plurality of task inputs.

18. The method of claim 11,
wherein the machine learning model comprises a reinforcement learning model, and
wherein training the machine learning model to apply, for the archetype task of the plurality of archetype tasks, the skill of the plurality of skills assigned to the archetype task to the one or more training inputs assigned to the archetype task and the one or more auxiliary inputs assigned to the archetype task to obtain the one or more output labels comprises:
training the machine learning model to apply, for the archetype task of the plurality of archetype tasks, the skill of the plurality of skills assigned to the archetype task to the one or more training inputs assigned to the archetype task and the one or more auxiliary inputs assigned to the archetype task to obtain an action sequence for solving the one or more tasks; and
performing the action sequence for solving the one or more tasks, and
wherein the method further comprises updating, by the generative memory, the training data with an observed state and a reward resulting from performing the action sequence for solving the one or more tasks.

19. The method of claim 11, further comprising outputting, by the machine learning model, an indication of the one or more output labels.

20. A non-transitory computer-readable medium comprising instructions that, when executed, are configured to cause processing circuitry of a computing device to:
receive training data defining one or more tasks, wherein the training data comprises a plurality of pairs of training inputs and training labels;

execute a generative memory configured to:
- assign one or more of the training inputs to each archetype task of a plurality of archetype tasks, wherein each archetype task of the plurality of archetype tasks is representative of a cluster of related tasks within a task space;
- assign, to each archetype task of the plurality of archetype tasks, a corresponding skill of a plurality of skills;
- generate, for each archetype task of the plurality of archetype tasks, auxiliary inputs;
- apply, for each archetype task of the plurality of archetype tasks, the auxiliary inputs to the skill assigned to the archetype task to obtain auxiliary labels to generate, from the auxiliary inputs and the auxiliary labels, auxiliary data comprising a plurality of pairs of the auxiliary inputs and the auxiliary labels
- apply, for each archetype task of the plurality of archetype tasks, auxiliary inputs to the skill assigned to the archetype task to obtain auxiliary labels to generate, from the auxiliary inputs and the auxiliary labels, auxiliary data comprising a plurality of pairs of the auxiliary inputs and the auxiliary labels;
- assign one or more of the auxiliary inputs to each archetype task of the plurality of archetype tasks; and execute a machine learning system executed by the processing circuitry and configured to train a machine learning model with the training data and the auxiliary data to apply, for an archetype task of the plurality of archetype tasks, the skill of the plurality of skills assigned to the archetype task to the one or more training inputs assigned to the archetype task and the one or more auxiliary inputs assigned to the archetype task to obtain one or more output labels that correspond to one or more of the training labels and the auxiliary labels, wherein the one or more training labels are associated with the one or more training inputs assigned to the archetype task and wherein the one or more auxiliary labels are associated with the one or more auxiliary inputs assigned to the archetype task such that the generative memory is capable of generating the auxiliary data from old tasks for use in training the machine learning model to obtain labels for new tasks for which the machine learning model has not previously been trained.

* * * * *